US010652178B2

(12) United States Patent
Takishima et al.

(10) Patent No.: US 10,652,178 B2
(45) Date of Patent: May 12, 2020

(54) INFORMATION PROCESSING APPARATUS, INFORMATION PROCESSING SYSTEM, AND INFORMATION PROCESSING METHOD

(71) Applicants: Naoki Takishima, Kanagawa (JP); Yoshiharu Tojo, Kanagawa (JP); Daisuke Koya, Kanagawa (JP); Kiriko Chosokabe, Tokyo (JP); Hiroya Uruta, Tokyo (JP)

(72) Inventors: Naoki Takishima, Kanagawa (JP); Yoshiharu Tojo, Kanagawa (JP); Daisuke Koya, Kanagawa (JP); Kiriko Chosokabe, Tokyo (JP); Hiroya Uruta, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/846,970

(22) Filed: Dec. 19, 2017

(65) Prior Publication Data

US 2018/0227251 A1 Aug. 9, 2018

(30) Foreign Application Priority Data

Feb. 8, 2017 (JP) .................................. 2017-021289

(51) Int. Cl.
*G06F 3/12* (2006.01)
*H04L 12/58* (2006.01)
*G06F 16/33* (2019.01)

(52) U.S. Cl.
CPC .......... *H04L 51/046* (2013.01); *G06F 3/1204* (2013.01); *G06F 3/1205* (2013.01);
(Continued)

(58) Field of Classification Search
CPC ..... H04L 51/046; H04L 51/16; G06F 3/1205; G06F 3/1268; G06F 3/1288; G06F 3/1292; G06F 3/1293; G06F 17/30684
See application file for complete search history.

(56) References Cited

U.S. PATENT DOCUMENTS

| 6,279,000 B1 * | 8/2001 | Suda .................... G06Q 10/109 |
| 2005/0162685 A1 * | 7/2005 | Heiles .................. G06F 3/1206 358/1.15 |

(Continued)

FOREIGN PATENT DOCUMENTS

| JP | 2001-109689 | 4/2001 |
| JP | 2011-058131 | 3/2011 |

(Continued)

*Primary Examiner* — Moustapha Diaby
(74) *Attorney, Agent, or Firm* — Oblon, McClelland, Maier & Neustadt, L.L.P.

(57) ABSTRACT

An information processing system includes circuitry that acquires input information input to a terminal apparatus, the terminal apparatus operating a message exchange program, determines, based on the input information being acquired, whether or not a condition as a trigger for calling an information processing service is satisfied, changes, based on the determination that the condition as the trigger for calling the information processing service is satisfied, a status of the message exchange program into a status that exchanges a message with the information processing service, acquires, based on the message to the information processing service, electronic information used for information processing, and requests an information apparatus to execute the information processing using the electronic information being acquired.

20 Claims, 14 Drawing Sheets

(52) U.S. Cl.
CPC .......... *G06F 3/1225* (2013.01); *G06F 3/1255* (2013.01); *G06F 3/1287* (2013.01); *G06F 3/1288* (2013.01); *G06F 3/1293* (2013.01); *H04L 51/02* (2013.01); *H04L 51/04* (2013.01); *G06F 3/1268* (2013.01); *G06F 3/1292* (2013.01); *G06F 16/3344* (2019.01); *H04L 51/16* (2013.01)

(56) References Cited

U.S. PATENT DOCUMENTS

| | | | | |
|---|---|---|---|---|
| 2005/0168772 | A1* | 8/2005 | Kim | G06F 3/1204 358/1.15 |
| 2006/0053124 | A1* | 3/2006 | Nishio | H04L 63/0815 |
| 2009/0067000 | A1* | 3/2009 | Takiyama | G06Q 10/02 358/1.15 |
| 2011/0066685 | A1* | 3/2011 | Kitada | H04L 51/08 709/206 |
| 2011/0071819 | A1* | 3/2011 | Miller | G06F 17/273 704/9 |
| 2013/0077129 | A1* | 3/2013 | Soh | G06K 15/02 358/1.15 |
| 2013/0226892 | A1* | 8/2013 | Ehsani | G06F 17/30864 707/706 |
| 2013/0275248 | A1* | 10/2013 | Miyashige | G06Q 20/209 705/24 |
| 2014/0002847 | A1* | 1/2014 | Mizuno | G06K 15/4095 358/1.14 |
| 2014/0207679 | A1* | 7/2014 | Cho | G06Q 20/108 705/44 |
| 2014/0293315 | A1* | 10/2014 | Takarabe | H04N 1/32122 358/1.14 |
| 2015/0049360 | A1* | 2/2015 | Lee | G06F 3/1292 358/1.15 |
| 2015/0109632 | A1* | 4/2015 | Imamura | H04N 1/00904 358/1.13 |
| 2015/0172505 | A1* | 6/2015 | Park | H04N 1/00307 358/1.15 |
| 2016/0042574 | A1* | 2/2016 | Yoshie | B41J 3/44 358/3.28 |
| 2016/0357519 | A1* | 12/2016 | Vargas | G06F 9/451 |
| 2017/0244652 | A1* | 8/2017 | Clarke | H04L 51/02 |
| 2018/0011724 | A1* | 1/2018 | Yoshida | H04N 1/00408 |
| 2018/0174222 | A1* | 6/2018 | Venkatakrishnan | G06Q 30/0633 |
| 2018/0181855 | A1* | 6/2018 | Johnson, Jr. | G06N 3/006 |

FOREIGN PATENT DOCUMENTS

| | | |
|---|---|---|
| JP | 2013-117938 | 6/2013 |
| JP | 2016-004596 | 1/2016 |

* cited by examiner

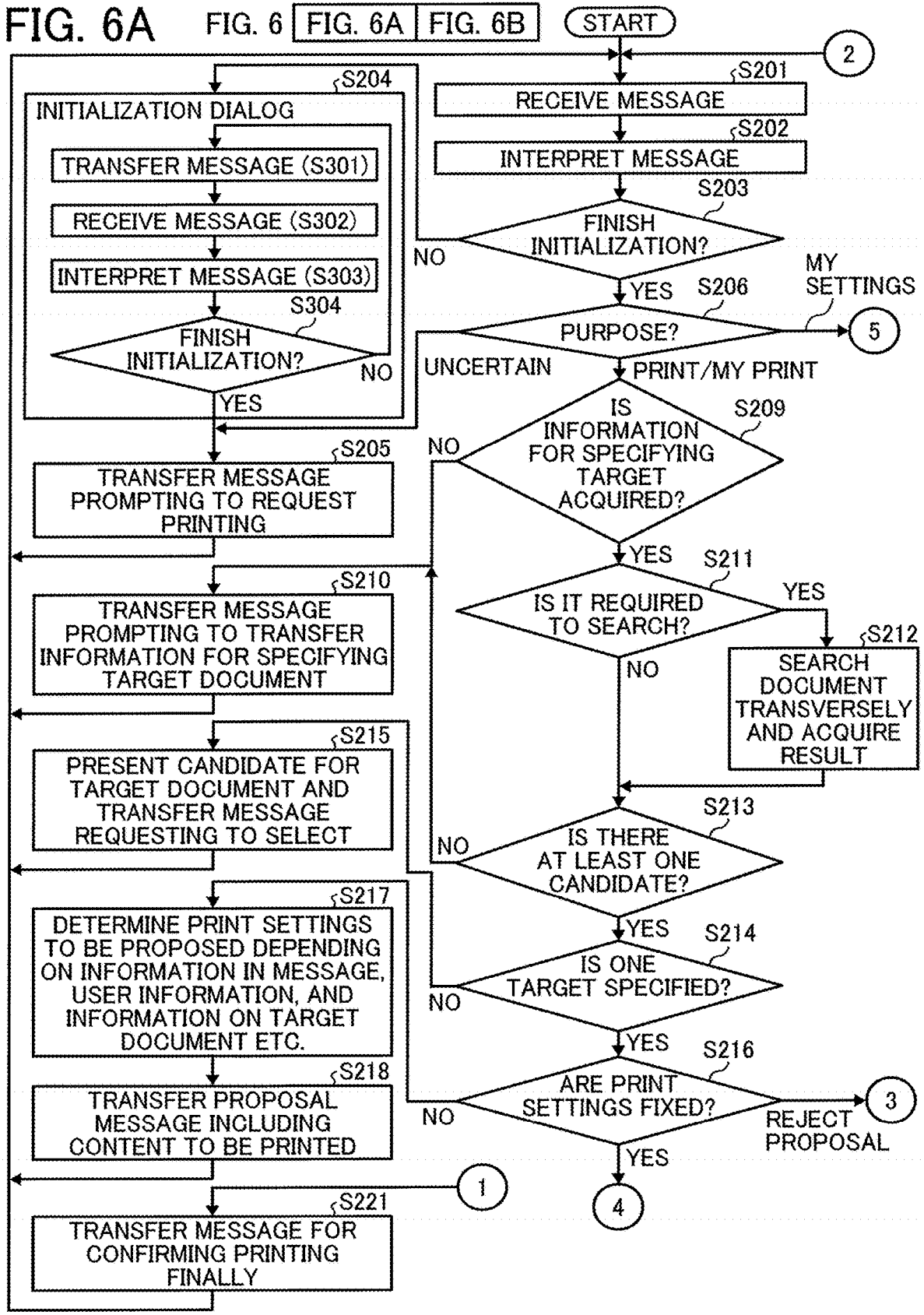

FIG. 7A

| KEYWORD | SERVICE |
|---|---|
| PRINTING, PRINT, OUTPUT PAPER | OUTPUT PRINT |
| PROJECT, PROJECTION, DISPLAY | OUTPUT PROJECTION |

FIG. 7B

| CONFERENCE NAME | PROGRESS REPORTING CONFERENCE |
|---|---|
| DATE AND TIME | 20xx/xx/xx 10:00-12:00 |
| SUBJECT | REPORT PROGRESS ON DEVELOPING SYSTEM A |
| ATTENDEES | MR. A, MR. B, MR. C, MR. D, MR. E, MR. F, AND MR. G |
| MATERIAL | http://xxx.xxx.xx.com/abcdetfghije/progress_report201701xx.pptx<br>http://xxx.xxx.xx.com/abcdetfghije/progress_report201612xx.pptx |

FIG. 7C

| DATE/TIME OF PRINTING | FILENAME | PRINTER |
|---|---|---|
| 20xx/xx/xx 10:25 | transportation expense reimbursement table.doc | MFP C ON 10TH FLOOR |
| 20xx/xx/xx 17:25 | transportation expense reimbursement table.doc | MFP C ON 10TH FLOOR |
| ... | ... | ... |

FIG. 7D

| PRINTER | MFP C ON 10TH FLOOR |
|---|---|
| DUPLEX/SIMPLEX | DUPLEX |
| COLOR | MONOCHROME |
| PAPER SIZE | A4 |
| PORTRAIT/LANDSCAPE | PORTRAIT |

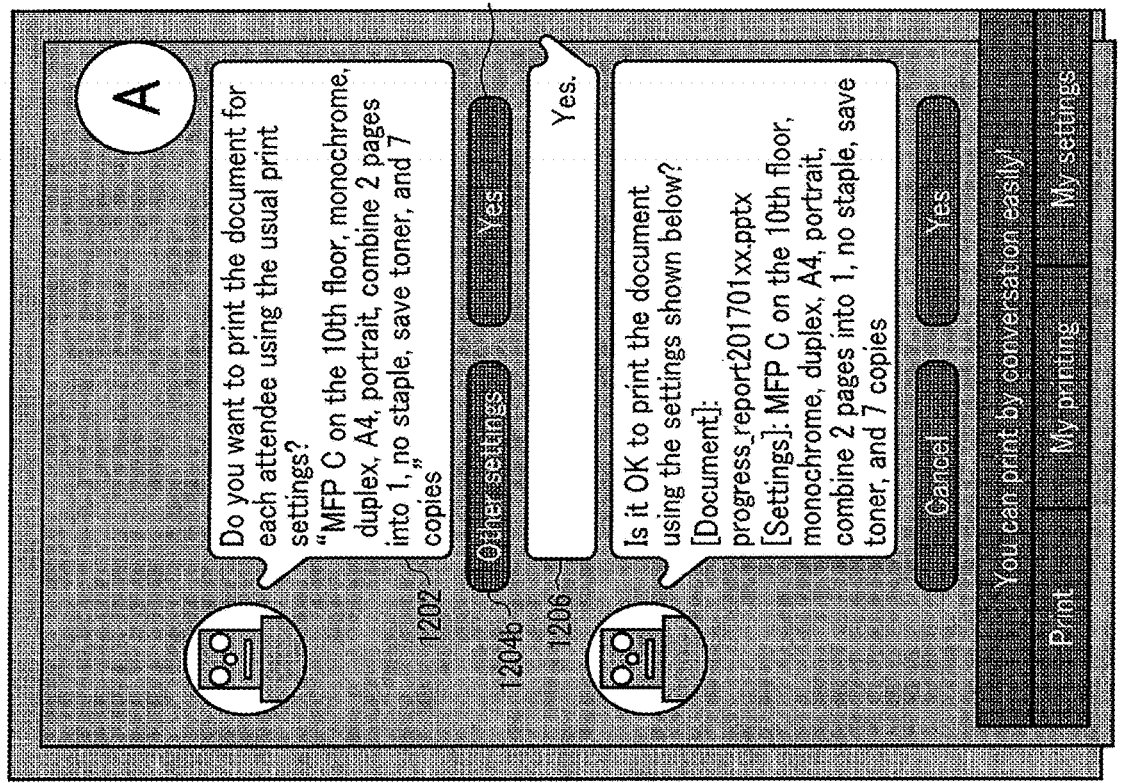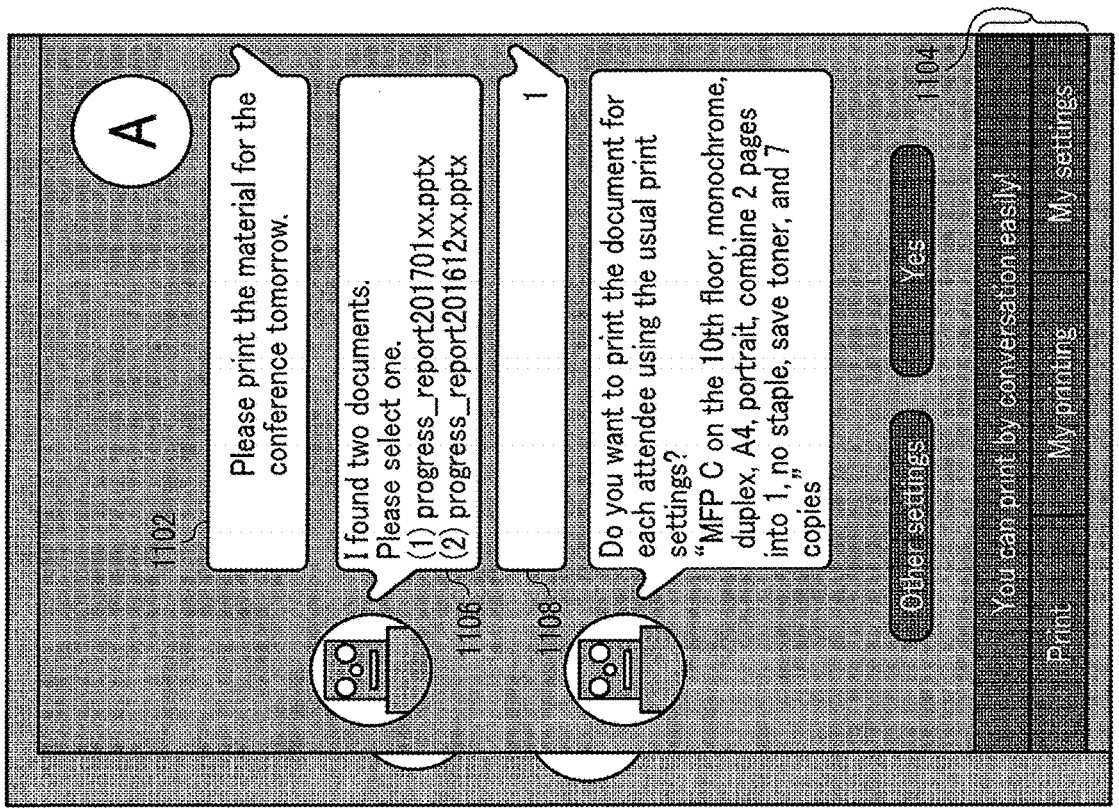

INFORMATION PROCESSING APPARATUS, INFORMATION PROCESSING SYSTEM, AND INFORMATION PROCESSING METHOD

CROSS-REFERENCE TO RELATED APPLICATION

This patent application is based on and claims priority pursuant to 35 U.S.C. § 119(a) to Japanese Patent Application No. 2017-021289, filed on Feb. 8, 2017 in the Japan Patent Office, the entire disclosure of which is hereby incorporated by reference herein.

BACKGROUND

Technical Field

The present invention relates to an information processing apparatus, an image processing system, and an image forming control method.

Background Art

Recently, the number of users who use instant messaging services on mobile information devices such as smartphones etc. is increasing. In addition, on systems that support messaging services, various software robot services are provided. For example, if a user wants information that satisfies a predetermined condition, a software robot that provides information is added as a virtual friend, and the user may receive a desired search result by chatting with the virtual friend.

For example, after receiving a request that adds a software robot as a friend of the user from the user via the messaging application on the user device, the software robot is added and registered as the friend of the user. The software robot sends a message that requests for input to the user via the application on the user device. After receiving a response message in response to the message that requests for input from the user, the software robot stores the response message as user information associated to the user, inputs the response message as a query, searches through a database for a response to the query, and transfers a response to the user via the application on the user device.

However, in processing information in a way that the user desires using a message exchange program such as a messaging application using the existing technology, the user needs to perform cumbersome operations. For example, the user needs to add and register the software robot that provides the information processing service as the friend and switch to a chat room to chat with the software robot.

SUMMARY

Example embodiments of the present invention provide a novel information processing system that includes circuitry that acquires input information input to a terminal apparatus, the terminal apparatus operating a message exchange program, determines, based on the input information being acquired, whether or not a condition as a trigger for calling an information processing service is satisfied, changes, based on the determination that the condition as the trigger for calling the information processing service is satisfied, a status of the message exchange program into a status that exchanges a message with the information processing service, acquires, based on the message to the information processing service, electronic information used for information processing, and requests an information apparatus to execute the information processing using the electronic information being acquired.

Further example embodiments of the present invention provide an information processing method and a non-transitory recording medium storing an information processing program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIGS. 6A and 6B are flowcharts illustrating an operation of calling service performed by the dialog output processing server in the information processing system as an embodiment of the present invention;

FIGS. 7A, 7B, 7C, and 7D are diagrams illustrating a data structure referred in the information processing system as an embodiment of the present invention;

FIGS. 9A and 9B are diagrams illustrating a screen displayed on the terminal apparatus in the information processing system as an embodiment of the present invention;

Figure 1:
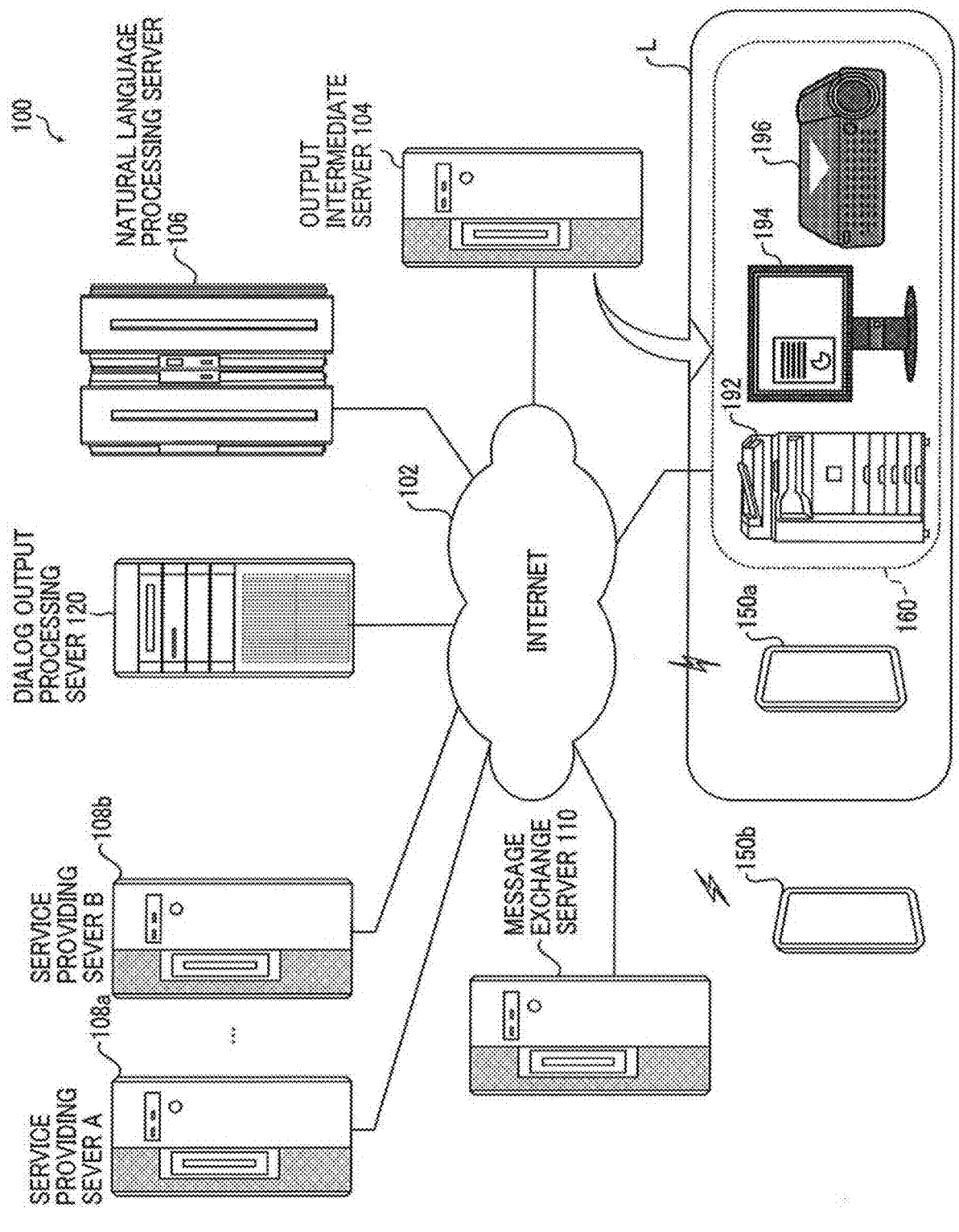
FIG. 1 is a diagram illustrating a network environment where an information processing system is located as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Exemplary embodiments of this disclosure are now described below with reference to the accompanying drawings.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result. In the embodiments described below, an information processing system that a terminal apparatus requests an information apparatus to perform output is described as an example. However, the information processing system is not limited to this configuration. For example, the present disclosure is applicable to an information processing system in which the terminal apparatus requests other type of information processing to be performed by a certain information apparatus.

FIG. 1 is a diagram illustrating a network environment 100 where an information processing system is located in this embodiment. The network environment 100 illustrated in FIG. 1 includes an output intermediate server 104, a natural language processing server 106, one or more service providing servers 108, a message exchange server 110, a dialog output processing server 120, one or more terminal apparatuses 150, and one or more information apparatuses 192 to 196.

The output intermediate server 104, the natural language processing server 106, the service providing server 108, the message exchange server 110, the dialog output processing server 120, the terminal apparatus 150 and the information apparatuses 192 to 196 communicate with each other via a network 102 using packet communication based on TCP/IP protocol. While the network 102 described above is not limited specifically, wired local area networks and wireless local area networks such as Ethernet (registered trademark) of 1000Base-TX and IEEE 802.11 specification etc., wide area networks such as virtual private network (VPN) etc., mobile communication networks such as 3G and Long-Term Evolution (LTE) etc. and public networks such as optical access networks etc. may be included.

The output intermediate server 104 intervenes print output, projection output, image display output, and image transfer output etc. for the information apparatuses 192 to 196. The output intermediate server 104 may be configured as a proprietary developed server, or the output intermediate server 104 may be a public server such as Google Cloud Print (registered trademark) etc. In addition, in alternative to or in addition to the outputting process, the output intermediate server 104 may provide a function that intervenes inputting process such as image scanning process etc. In addition, while one output intermediate server 104 is illustrated in FIG. 1, in accordance with a type of outputting processes and protocols, multiple output intermediate servers may be provided, which support various outputting processes and protocols in the network environment 100.

The natural language processing server 106 provides a service that analyzes text including a natural sentence by using natural language processing. Furthermore, the natural language processing server 106 may convert voice into text and convert text into voice. The natural language processing server 106 may be configured as a proprietary developed server, or the natural language processing server 106 may be the public server such as IBM Watson (registered trademark) and Google Cloud Natural Language Application Programming Interface (API) etc. In response to a request from a requestor, the natural language processing server 106 performs natural language process and responds a processing result to the requestor.

The service providing server 108 provides information storing services such as storage function, calendar function, and office application function etc. via the network 102. The functions described above may be provided in the form of Infrastructure as a Service (IaaS), Platform as a Service (PaaS), and Software as a Service (SaaS) etc. The service providing server 108 may be configured as a proprietary developed server, or the service providing server 108 may be the public server such as Dropbox (registered trademark), box (registered trademark), and G Suite (registered trademark) etc. In addition, while two service providing servers 108a and 108b are illustrated in FIG. 1, in accordance with a type of services and entities that provides service, multiple service providing servers 108 may be provided in the network environment 100.

The message exchange server 110 provides an instant messaging service that intermediates messages between users and between a user and a software robot (also referred to as a chat bot). The message exchange server 110 may be configured as a proprietary developed server, or the message exchange server 110 may be a server that exchanges a message in the existing instant messaging (chat) application such as Slack (registered trademark), LINE (registered trademark), Skype (registered trademark), and ChatWork (registered trademark) etc.

The terminal apparatus 150 is a mobile information terminal apparatus such as a smartphone, tablet device, and wearable computer etc. and an information processing apparatus such as a personal computer (PC) etc. In addition, the terminal apparatus 150 may be a robot apparatus such as a communication robot or a hologram projector such as a virtual presenter etc. In the terminal apparatus 150, a client application that supports the instant messaging service provided by the message exchange server 110 described above is installed. A user of the terminal apparatus 150 may exchange messages with other users and software robots via the client application. The terminal apparatus 150 may be located in a predetermined location L in an organization such as public offices, medical institutions, education institutions, and corporations etc. and other locations.

The information apparatuses 192 to 196 may be an image forming apparatus such as a multifunction peripheral (MFP) and printer, an image projector such as a projector, an image display apparatus such as an electronic whiteboard including Interactive White Board (hereinafter referred to as IWB) as an example, an image transmission apparatus (an image communication apparatus) such as a facsimile, and an image scanning apparatus such as a scanner etc. In FIG. 1, a MFP 192, an IWB 194, and a projector 196 are illustrated.

For example, in the network environment 100 illustrated in FIG. 1, a user who uses the terminal apparatus 150*a* wants to print an intended electronic document on one or more service providing servers 108 using the MFP 192 located in the location L same as the terminal apparatus 150*a*. Otherwise, the user may want to project an intended electronic document using the projector 196, display an intended electronic document using the IWB 194, transfer an intended electronic document from the image transfer apparatus, and input an image into a predetermined storing location from the image input apparatus. In this case, it is preferable to achieve an intended information processing result simply with less labor as possible.

Among the terminal apparatus 150 and the information apparatuses 192 to 196 described above, the dialog output processing server 120 illustrated in FIG. 1 provides a software robot service that the terminal apparatus 150 requests the information apparatuses 192 to 196 to perform information processing (such as output processing and input processing) using dialog via the messaging service described above.

In order to achieve the purpose of performing the information processing described above, the dialog output processing server 120 communicates with the user via the messaging service described above to extract the request for information processing that the user requests. In interpreting the received message, by using the natural language processing service provided by the natural language processing server 106, the dialog output processing server 120 may extract the purpose to perform printing, information for specifying electronic information to be processed, and information for determining processing condition for processing the electronic information. After extracting the request to perform information processing from the user, the dialog output processing server 120 acquires electronic information to be processed from the service providing server 108 etc. and issues a request for information processing to the corresponding information apparatuses 192 to 196 under the predetermined processing condition.

In a configuration that the dialog output processing server 120 belongs to a network different from the information apparatuses 192 to 196 and communicates with the information apparatuses 192 to 196 via the public network, the request to process output is performed via the output intermediate server 104. By contrast, in a configuration that the dialog output processing server 120 may communicate with the information apparatuses 192 to 196 via the intranet such as the dialog output processing server 120 is located in a private cloud etc., the dialog output processing server 120 may request to process output directly to APT for information apparatuses 192 to 196 instead of being intervened by the output intermediate server 104.

Figure 2:
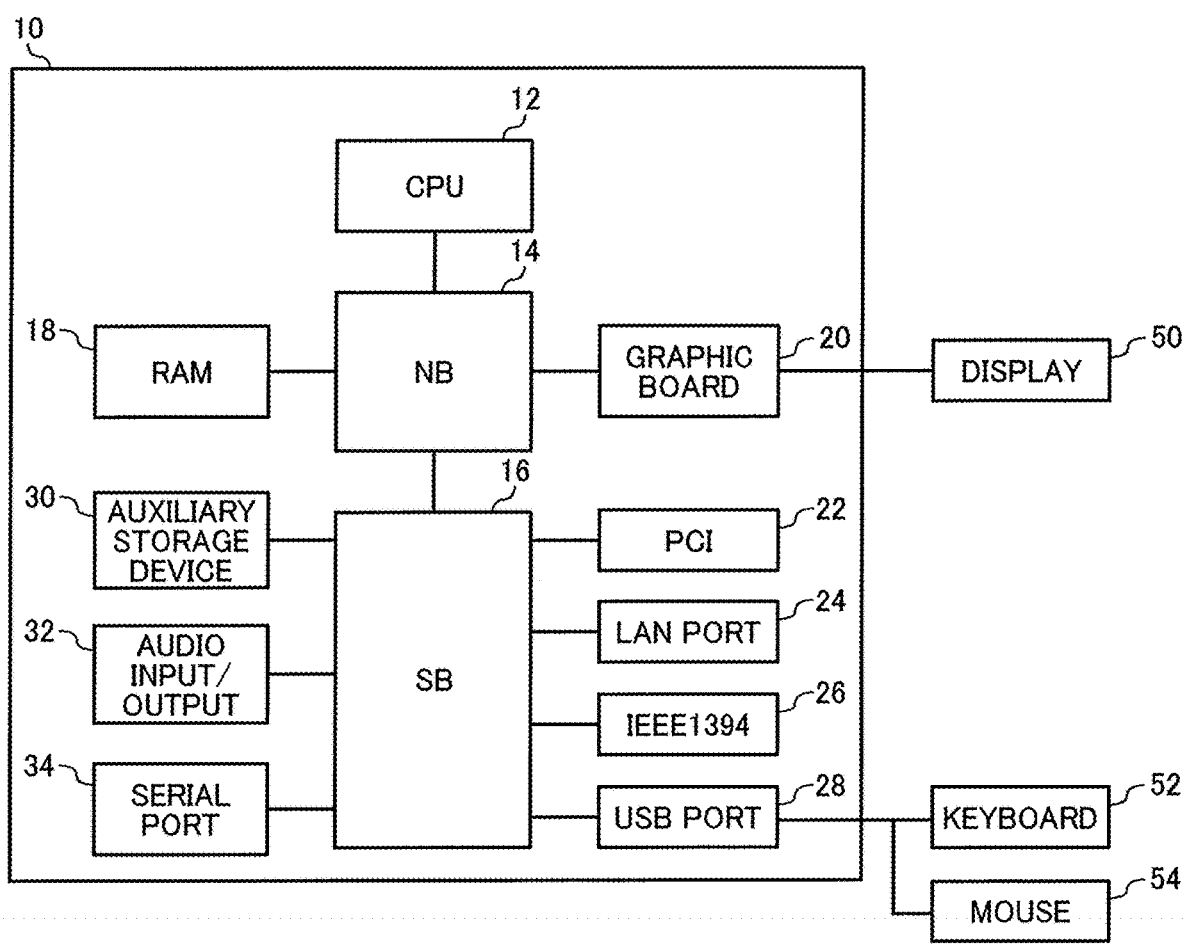
FIG. 2 is a diagram illustrating a hardware configuration of a computer used as a dialog output processing server and terminal apparatus as an embodiment of the present invention.

Hardware configuration of the dialog output processing server 120 and the terminal apparatus 150 in this embodiment is described below with reference to FIG. 2. FIG. 2 is a diagram illustrating a hardware configuration of a computer 10 used as a dialog output processing server 120 and a terminal apparatus 150 in this embodiment. Typically, a computer 10 may be constructed as a generic computer apparatus.

The computer 10 illustrated in FIG. 2 includes a central processing unit (CPU) 12, a Northbridge 14 that connects the CPU 12 to a memory, and a Southbridge 16. The Southbridge 16 is connected to the Northbridge 14 described above via a dedicated bus or Peripheral Component Interconnect (PCI) bus and connects the PCI bus to input/output (I/O) such as USB etc.

A random access memory (RAM) 18 that provides a work area for the CPU 12 is connected to the Northbridge 14. Furthermore, a graphic board 20 that outputs a video signal to the Northbridge 14, is connected to the Northbridge 14. A display 50 may be connected to the graphic board 20 via a video output interface.

A PCI 22, a LAN port 24, an IEEE 1394 port 26, a USB port 28, an auxiliary storage device 30, an audio input/output 32, and a serial port 34 are connected to the Southbridge 16. The auxiliary storage device 30 is a hard disk drive (HDD) and solid state drive (SSD) etc. and stores an operating system (OS) for controlling the computer 10, a control program for implementing functional units (described later), various system information, and various configuration information. The LAN port 24 is an interface device that connects the computer 10 to the network 102 using a wired or wireless connection.

Input devices such as a keyboard 52 and a mouse 54 etc. may be connected to the USB port 28. The computer in this embodiment reads a control program for the dialog output processing server 120 or the terminal apparatus 150 from the auxiliary storage device 30 and expands it into the work area provided by the RAM 18 to implement functional units and processes (described later) under the control of the CPU 12. Here, while the output intermediate server 104, the service providing server 108, the natural language processing server 106, the message exchange server 110, and the information apparatuses 192 to 196 are not described specifically, likewise, hardware such as the CPU and RAM etc. and hardware in accordance with specific usage are included.

Figure 3:
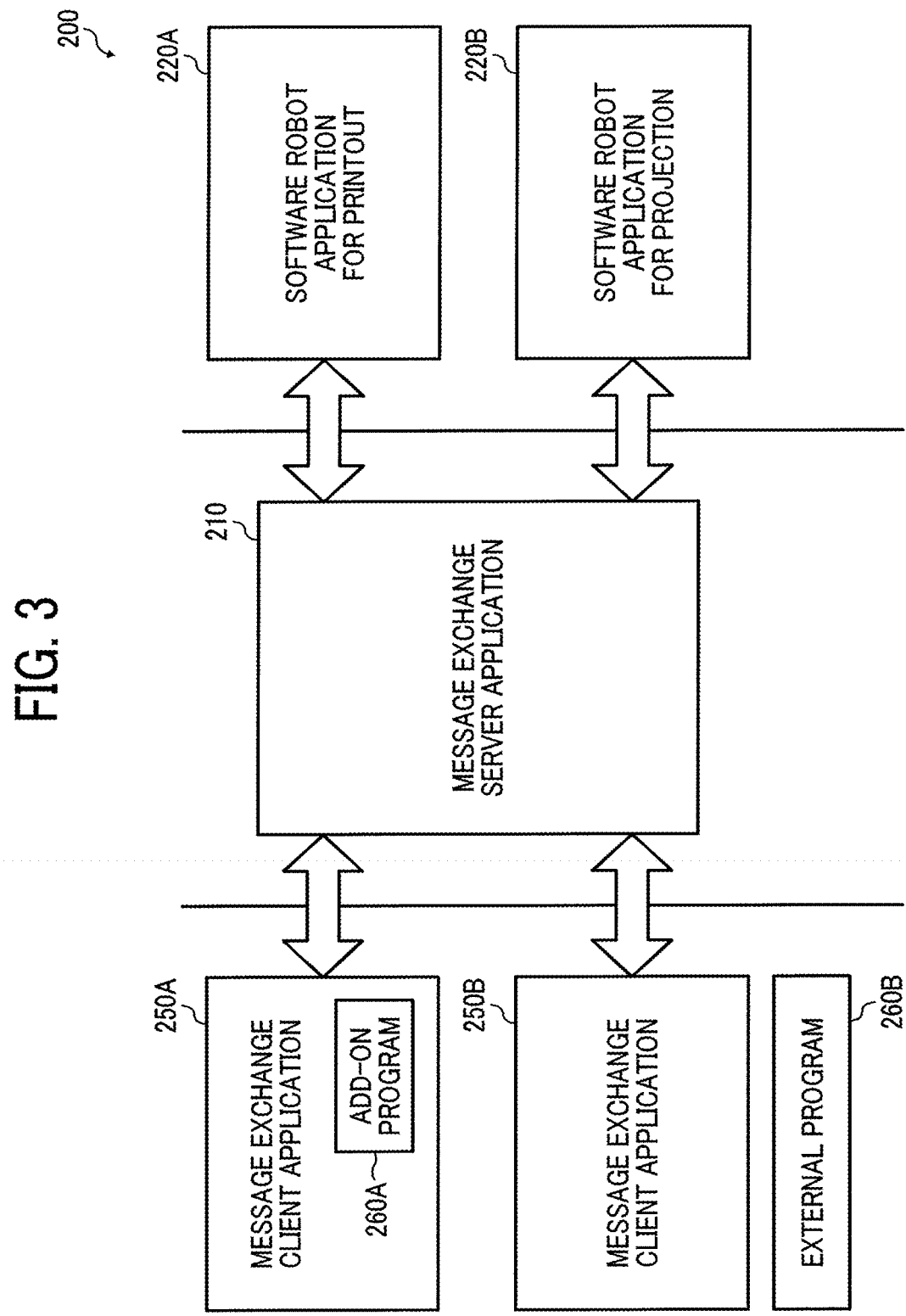
FIG. 3 is a diagram illustrating a software configuration in the information processing system as an embodiment of the present invention.

FIG. 3 is a diagram illustrating a software configuration in the information processing system in this embodiment. As illustrated in FIG. 3, in a software configuration 200, a message exchange server application as a server-side message exchange program (hereinafter referred to as server application simply) 210, a message exchange client application as a client-side message exchange program (hereinafter referred to as client application simply) 250, and one or more software robot application 220 are included.

The server application 210 runs on the message exchange server 110 described above and includes a logic that intervenes message exchange between users and user and software robot. The client application 250 runs on the terminal apparatus 150 and communicates with the server application 210 to exchange messages. After receiving the input from the terminal apparatus 150, the client application 250 may request the server application 210 to transfer the message to other users and software robot. In addition, the client application 250 may acquire a message transferred to its own user by other users and software robot from the server application 210 and report to the user by displaying a screen and outputting sound. Here, the exchanged message may include text, voice, video, image, and their combinations.

The software robot application 220 provides a software robot service that the terminal apparatus 150 requests the information apparatuses 192 to 196 to perform predetermined information processing (output processing and input processing). In FIG. 2, as the software robot application 220, a software robot application for printing (hereinafter referred to as application for printing) 220A and a software robot application for projection (hereinafter referred to as application for projection) 220B are illustrated. The application for printing 220A includes a logic for generating a dialog for printing an electronic document and a function of requesting for printing that requests the information apparatus (such as the MFP 192) to perform printing. Similarly, the application for projection 220B includes a logic for generating a dialog for projecting an electronic document and a function of requesting for projection that requests the information apparatus (such as the projector 196) to perform projection.

Other than that, in addition to the configuration illustrated in FIG. 2, application may be provided in accordance with displaying an image using the IWB 294, transferring an image using the image transfer apparatus, and inputting an image using the image scanner, respectively. Otherwise, one application may provide a combination of two or more information processing such as printing, projection, displaying an image, transferring an image, and inputting an image etc. described above as a whole.

Furthermore, in the terminal apparatus 150 in FIG. 3, a program 260 that provides an integrated service as a contact that calls one of the multiple software robots in cooperation with the client application 250 is installed.

In this embodiment, for example, on the client application 250A, if a sentence such as "I need to print a document that I updated yesterday" is input by user operation, the program 260 detects a keyword "print" registered preliminarily. In addition, the program 260 specifies the application for printing 220A corresponding to the keyword "print" and change a status of the application for printing 220A into an available status on the client application 250A. Subsequently, through the interaction with the application for printing 220A, the dialog output processing server 120 performs an operation of searching for the electronic document and printing out the electronic document. Similarly, for example, a sentence "please project the document that I prepared yesterday" etc. is input by user speech, the program 260 calls the application for projection 220B and change a status of the application for projection 220B into an available status for searching for the electronic document and projecting the electronic document through the interaction with the application for projection 220B.

Here, by changing the status, the chat room for exchanging message with the software robot (also referred to as talk screen etc.) is displayed, and notification of reporting that the chat room is available and accepting an operation of transitioning into the chat room are displayed. In addition, in the below description, it is assumed that the exchanged message is text. However, the format of the message is not limited to text. For example, if the voice message is transferred, by converting the voice into text, the voice message can be handled in the same way as the text message.

In FIG. 3, two configurations of the program that provides the integrated service described above on the side of the terminal apparatus 150 are illustrated.

In the first configuration, an add-on program 260A is integrated in the client application 250A. In this embodiment, the add-on program 260A is integrated in the client application 250A, the add-on program 260A runs on the terminal apparatus 150 along with the client application 250A to provide the integrated service described above. In the first configuration, the integrated service may operate as a service that resides in the client application 250A.

In the second configuration, an external program 260B separated from the client application 250A is provided. The external program 260B provides the function of the add-on program 260A described above as an external function. The external program 260B operates on the terminal apparatus 150 cooperating with the client application 250A and is configured to provide the integrated service described above. In the second configuration, the integrated service may operate as an application that resides in the operating system on the terminal apparatus 150.

Figure 4:
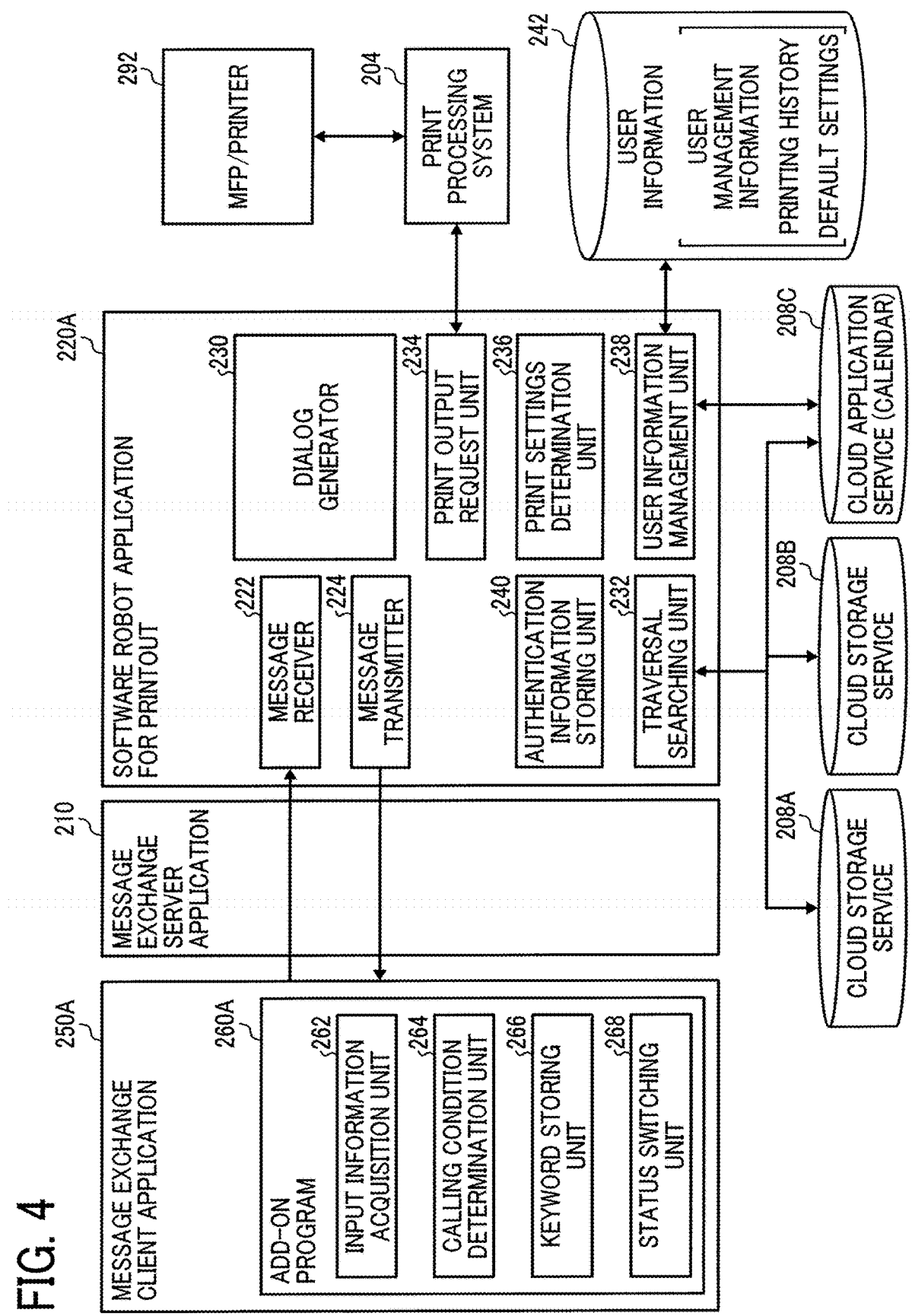
FIG. 4 is a diagram illustrating functional blocks implemented in the information processing system as an embodiment of the present invention.

With reference to FIG. 4, taking the first configuration described above as an example, functions provided by the program 260 and provided by the software robot application 220 are described below in detail. FIG. 4 is a diagram illustrating functional blocks implemented in the information processing system in this embodiment.

With reference to FIG. 4, functional blocks on the side of the client application 250 that constructs the information processing system are described below. As illustrated in FIG. 4, more specifically, the add-on program 260A of the client application 250A includes an input information acquisition unit 262, a calling condition determination unit (determining unit) 264, a keyword storing unit (memory) 266, and a status switching unit 268.

The input information acquisition unit 262 acquires input information input into the client application 250A in the terminal apparatus 150. Here, simply describing, the input information is text information input via a software keyboard or a hardware keyboard. However, the input information is not limited to text information and could be voice information input via a microphone. As described above, by converting voice into text, voice message can be handled just like text message. The input information acquisition unit 262 implements an input acquisition unit in this embodiment.

Based on the input information acquired by the input information acquisition unit 262 as described above, the calling condition determination unit 264 determines whether or not each condition as a trigger for calling the software robot for printing or software robot for projection described above is satisfied. The keyword storing unit 266 stores one or more keywords, as the condition, which is a trigger for calling each software robot.

Here, in this embodiment, it is determined whether or not the condition as the trigger for calling is satisfied by determining simply whether or not the keyword is included in the text of the input information, and the operation is performed by the terminal apparatus 150.

However, in other embodiments, more complicated determination process could be performed. In addition, the configuration is not limited to the configuration that the operation is performed by the terminal apparatus 150. If it is allowed to transfer the input information to the server, the add-on program 260A on the terminal apparatus 150 may transfer the acquired input information to the dialog output processing server 120, the dialog output processing server 120 may determine whether or not the condition is satisfied, and the determination result may be returned to the terminal apparatus 150. If the determination process becomes complicated, the processing load can be distributed from the terminal apparatus 150 to the dialog output processing server 120.

For example, assuming that printing operation is called if a similar sentence is detected, multiple natural sentences can be prepared beforehand as training data and perform machine learning associated with printing operation. As a result, by detecting a predetermined element in the message, a learning model that determines whether or not the condition for printing is satisfied can be prepared.

In addition, in this embodiment, the calling condition determination unit 264 determines the service for printing or service for projection as described above. Here, the calling condition determination unit 264 may determine any one or more services for performing information processing different from each other respectively. The calling condition determination unit 264 implements a determination unit or determination result acquisition unit in this embodiment.

If the calling condition determination unit 264 determines that the service whose condition is satisfied exists, the status switching unit 268 changes the status of the client application 250A in the terminal apparatus 150 into the status that exchanges a message with the software robot whose condition is satisfied. As described above, more specifically, it is possible to display the chat room with the software robot (e.g., for printing) whose condition is satisfied, or display a notification related to the chat room. If the terminal apparatus 150 is a communication robot etc., an operating mode of the communication robot can be changed.

In this case, the software robot may appear on the chat room where the detected message described above is input (for example, a chat room with users A and B or a group chat room with users A, B, and C). Otherwise, the chat room can be switched into another dedicated chat room and the software robot may appear on the dedicated chat room. The status switching unit 268 implements a switching unit in this embodiment.

After switching the status, for example, on the chat room, the client application 250A may transfer the input information that the keyword is detected as described above and a message to start a session for performing outputting process to the corresponding software robot via the server application 210. As a result, a series of dialog session with the software robot for requesting information processing is started.

Here, in this embodiment, with reference to FIG. 4, by taking the first configuration as an example, the functions that the add-on program 260A provides are described. Here, in the second embodiment described above, the external program 260B may support approximately similar functions. In this case, while the external program 260B operates as another process different from the client application 250B, based on analysis by acquiring a screenshot of the screen on the terminal apparatus 150 regularly and performing pattern-matching etc. or record of a key input (keystroke) for each one character, the input information acquisition unit 262 may acquire the input information. By transferring a command from the external program 260B to the client application 250, the status switching unit 268 may request the client application 250B to switch status and transfer message etc.

With reference to FIG. 4, functional blocks on the side of the software robot application 220 that constructs the information processing system are described below taking the application for printing 220A as an example. The application for printing 220A includes a message receiver 222, a message transmitter 224, a dialog generator 230, a traversal searching unit 232, a print output request unit 234, a print settings determination unit 236, a user information management unit 238, and an authentication information storing unit 240.

The message receiver 222 communicates with the server application 210 and receives a message that the user transfers to the corresponding software robot for printing via the client application 250. The message transmitter 224 communicates with the server application 210 and transfers a message generated internally in the application for printing 220A to the user.

The dialog generator 230 analyzes the message received by the message receiver 222, generates a response message, and commands the message transmitter 224 to transfer the response message. Through the dialog with the user, the dialog generator 230 extracts information required for requesting to print. Here, in the required information, an application in use (in this case, print), target specifying information for specifying a target to be printed (such as information on a document name, information on updated date/time and created date/time, information on search range, and information on creator etc.) and information for specifying settings (such as information on output destination, information on specifying default settings (default condition), information on color mode, information on combination, and information on paper etc.) may be included. In case of the application for projection 220B, in the required information, an application in use (in this case, project), target specification information for specifying a target to be projected, and information specifying settings (such as information on projection of the first page, information on projection of the updated page lastly, and information on projection of the agenda etc.). If there is insufficient information, the dialog generator 230 generates a message to prompt to input required information and requests to transfer the message.

The dialog generator 230 in this embodiment manages an internal status regarding printing associating users with exchanged messages, updates the internal status by performing dialog using one or more messages, and fill information required for printing.

After acquiring the application in use (in this case, print) and the target specifying information, the dialog generator 230 requests the traversal searching unit 232 to search for the electronic document and acquires the search result. In addition, after acquiring the setting specifying information, the dialog generator 230 requests the print settings determination unit 236 to determine print settings and acquire the determined print settings. Furthermore, before performing printing out, the dialog generator 230 may command the message transmitter 224 as a transmitter to transfer a confirmation message to check if the acquired electronic document is to be printed. After receiving an affirmative response message to the confirmation message, the dialog generator 230 requests the print output request unit 234 to request to perform printing the electronic document under the predetermined settings.

Preferably, after performing the search, the dialog generator 230 may generate a dialog depending on whether or not one candidate for the corresponding electronic information is specified. If one candidate is not specified, the dialog generator 230 generates a dialog message presenting multiple candidates for the electronic information included in the search result along with priorities, and commands the message transmitter 224 to transfer the dialog message. After analyzing a response message received by the message receiver 222, the dialog generator 230 may accept one candidate for the electronic information specified by user operation among multiple candidates for the electronic information. The dialog generator 230 implements a dialog generating unit in this embodiment.

In response to the request from the dialog generator 230, the traversal searching unit 232 generates a search condition in accordance with the internal status based on the received message and acquires the electronic document used for printing by searching through the information storing service registered preliminarily. In FIG. 4, the preregistered service includes cloud storage services 208A and 208B and cloud application service 208C including a calendar function. Here, it is assumed that authentication information for accessing the preregistered service providing server 108 is preliminarily stored in the authentication information storing unit 240.

Based on the result of processing natural language of the message by the natural language processing server 106, the traversal searching unit 232 may generate the search condition. For example, if a natural phrase "a presentation document created yesterday" etc. is included in the message, since the target specifying information such as the updated date/time and the document type etc. has already been extracted, the search condition including conditions for updated date/time and the document type may be generated. If a natural phrase "a proposal document for Mr. X" etc. is included in the message, since the target specifying information regarding the file name has already been extracted, for example, the search condition including a condition that the file name includes "X" etc. may be generated. In performing searching, the traversal searching unit 232 may search for the electronic information based on user information associated with the user of the terminal apparatus 150. For example, if a natural phrase "a presentation document for a conference tomorrow" is included in the message, it is possible to search through user's schedule information for information regarding "conference tomorrow" and acquire electronic information based on a link etc. included in the specified schedule information.

After acquiring one electronic document or multiple candidates for electronic document, the traversal searching unit 232 returns a search result to the dialog generator 230. The traversal searching unit 232 implements an information acquisition unit in this embodiment. Here, if the information processing that the software robot is in charge is outputting process, an electronic document to be output is acquired. If the information processing is inputting process, for example, a location where data whose image is input is to be stored (such as information specifying a predetermined directory on a predetermined cloud server etc.) may be acquired.

In response to the request from the dialog generator 230, the print output request unit 234 requests the information apparatus (the MFP 192) to print out the acquired electronic document under the predetermined print settings via the print processing system 204 on the output intermediate server 104. Preferably, if an affirmative response message against the confirmation message described above is received, the print output request unit 234 may request to print out. In addition, preferably, after issuing the request, in response to receiving the printing result from the information apparatus (the MFP 192), the print output request unit 234 may record a history of printing operations that have been performed. For example, the history of performing printing out may be used for prioritizing the multiple electronic documents described above in presenting the multiple electronic documents.

Here, the operation of printing using the electronic information includes printing out the acquired electronic information (processing the electronic information) as is and generating separate electronic document by customizing the electronic document (e.g., destination etc. is customized using a dialog) based on the acquired electronic document (e.g., template) and printing out the generated electronic document.

In addition, in this embodiment, the search range defines various cloud services 208 for search. Preferably, the search range may include the local storage in the terminal apparatus 150 and the storage in the dialog output processing server 120.

Before performing printing, in response to the request from the dialog generator 230, the print settings determination unit 236 determines print settings for printing and returns the print settings to the dialog generator 230. The print settings may be determined based on at least any one of a type of the acquired electronic document specified by the extension, attribute such as a file name etc. attached to the acquired electronic information, schedule information associated with the user of the terminal apparatus 150 and user information such as authority etc., default print settings (default condition) configured preliminarily, and input print settings (input condition) acquired through the dialog. Here, the print settings includes a destination information apparatus, paper size, color mode, combination, finisher settings, and whether or not it is required to save toner etc. The print settings determining unit 236 implements a setting determination unit in this embodiment.

The user information management unit 238 acquires user information 242 associated with the user of the terminal apparatus 150. Here, the user information includes at least any one of schedule information such as conference information, history of performing printing operation, history of print settings, and user management information. The user management information includes authority information etc. for example. The user information may be used for specifying the electronic document to be printed, prioritizing the electronic document to be presented, and determining print settings. For example, if it is recommended to print a document in monochrome mode due to office policy etc., a user at predetermined job type or job position may determine print settings based on authority information and policy.

The authentication information storing unit 240 stores authentication information for each of multiple information storing services. For example, when the user sends a message to the software robot for printing for the first time, the authentication information may be configured by using a dialog for initial setting. The information stored by the authentication information storing unit 240 is referred by the traversal searching unit 232. The authentication information storing unit 240 implements an authentication information storing unit in this embodiment.

Here, while only the application for printing 220A is illustrated in FIG. 4, similar configuration may be applied for the application for projection 220B and other software robot applications for outputting.

Operations performed in the information processing system in this embodiment are described in detail below with reference to flowcharts in FIGS. 5, 6A, and 6B, data structure in FIGS. 7A, 7B, 7C, and 7D, and screens in FIGS. 8A, 8B, 9A, 9B, 10A, 10B, 11A, and 11B.

Figure 5:
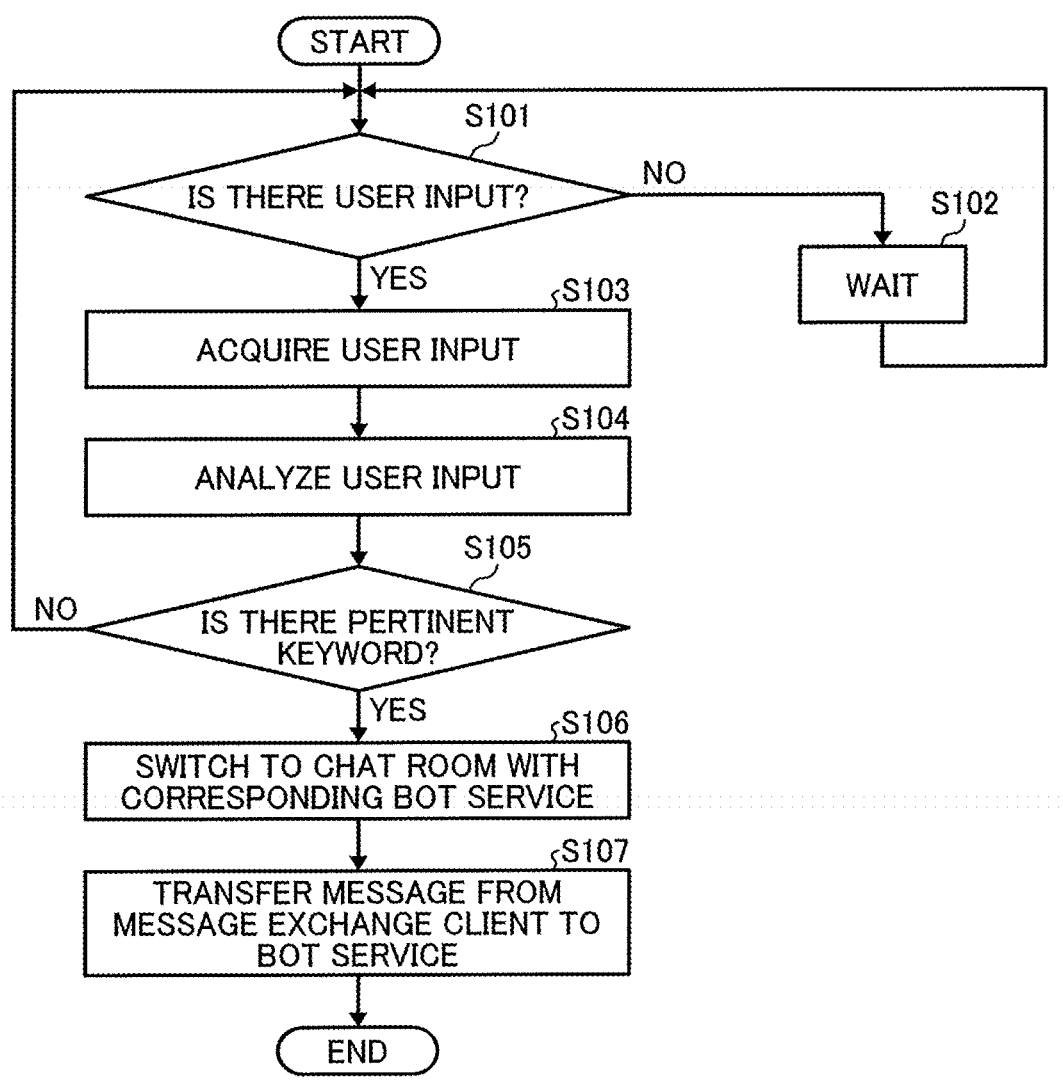
FIG. 5 is a flowchart illustrating an operation of calling service performed by the terminal device in the information processing system as an embodiment of the present invention.

FIG. 5 is a flowchart illustrating an operation of calling service performed by the terminal apparatus 150 in the information processing system in this embodiment. FIG. 7A is a diagram illustrating a keyword registration table, FIG. 7B is a diagram illustrating schedule information, FIG. 7C is a diagram illustrating a print execution history, and FIG. 7D is a diagram illustrating data structure of default print settings. FIGS. 8A, 8B, 9A, 9B, 10A, 10B, 11A, and 11B are diagrams illustrating a screen displayed on the terminal apparatus 150 in the information processing system in this embodiment.

The operation illustrated in FIG. 5 starts in response to an event that the client application 250 in the terminal apparatus 150 is executed. In S101, the terminal apparatus 150 determines whether or not there is user input. If it is determined that there is still no user input (NO in S101), after waiting for a predetermined period of time in S102, the operation goes back to S101. By contrast, if it is determined that there is user input (YES in S101), the operation proceeds to S103.

In S103, the terminal apparatus 150 acquires the user input using the input information acquisition unit 262. In S104, the terminal apparatus 150 analyzes the user input using the calling condition determination unit 264. FIG. 7A illustrates a data structure of a keyword registration table referred to in the operation of calling service performed on the terminal apparatus 150. In S105, using the calling condition determination unit 264, the terminal apparatus 150 determines whether or not the corresponding keyword exists and the condition as the trigger for calling the software robot service is satisfied. If the keyword registered in the keyword registration table illustrated in FIG. 7A is detected in the input information, the corresponding information processing service is specified.

If no corresponding keyword is included and no condition as the trigger for calling services is satisfied (NO in S105), the operation goes back to S101 and subsequent user input is processed. By contrast, if the corresponding keyword is included and a condition as the trigger for calling the software robot service is satisfied (YES in S105), the operation proceeds to S106. In S106, the terminal apparatus 150 switches to the chat room with the corresponding service whose condition as the trigger for calling is satisfied.

Figure 8B:
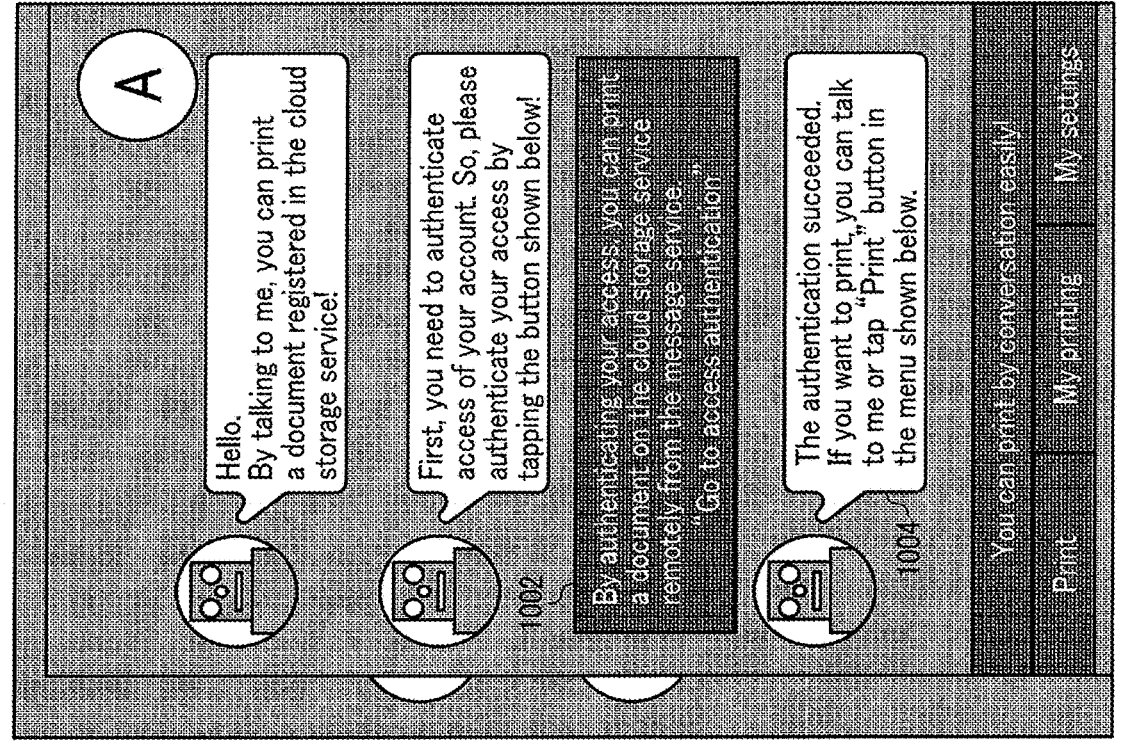
FIGS. 8A and 8B are diagrams illustrating a screen displayed on the terminal apparatus in the information processing system as an embodiment of the present invention.
Figure 8A:
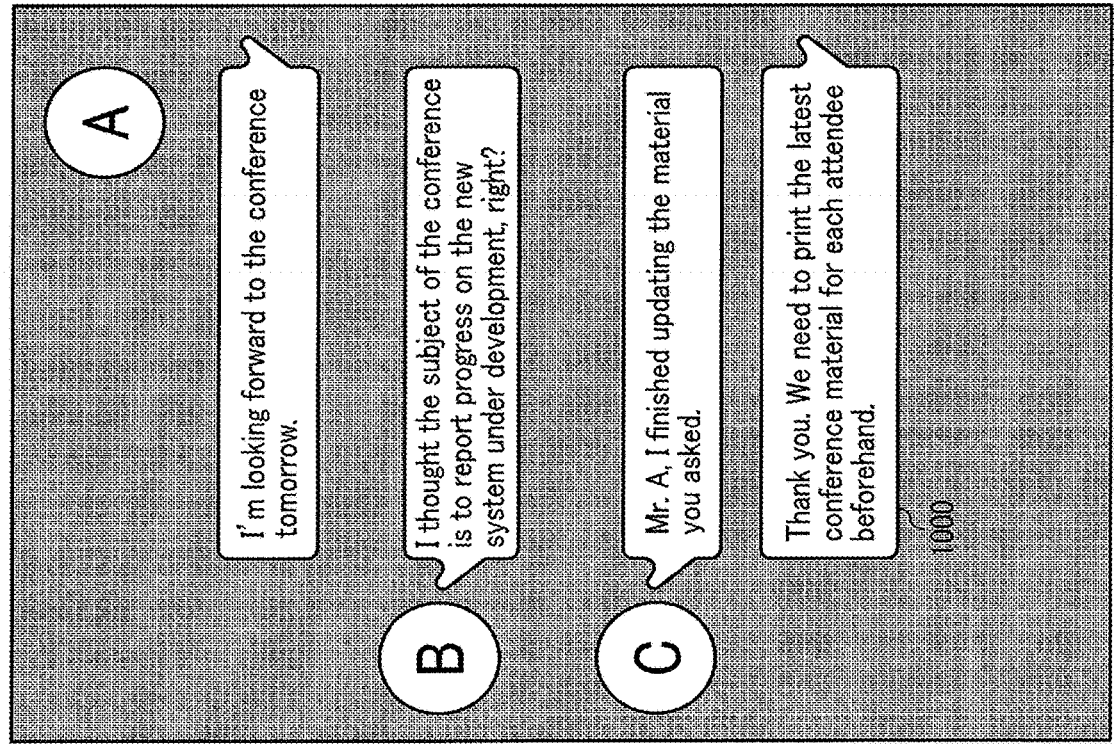

FIG. 8A illustrates a screen of group chat among user A on the terminal apparatus 150 and users B and C on other terminal apparatuses displayed on the terminal apparatus 150. With reference to FIG. 8A, the user A sends a message 1000 including a keyword "print". FIG. 8B illustrates a screen of chat with the software robot for printing displayed on the terminal apparatus 150. In a specific embodiment, in response to the event that it is detected that the keyword "print" is included in the message 1000 lastly illustrated in FIG. 8A, the screen is switched to the chat screen illustrated in FIG. 8B.

In S107, the client application 250 transfers a message to the corresponding software robot, and the operation ends. In this case, the transferred message may be a message for calling a chat bot, or the transferred message may be the message itself in the dialog between the users that the keyword is detected. That is, in the case illustrated in FIG. 8A, the message "Thank you. We need to print the latest conference material for each attendee beforehand." that the keyword is detected may be transferred as is, and the chat bot may specify the purpose of "printing the latest conference material for each attendee beforehand", the target specifying information, and print settings.

Hereinafter, by using the client application 250, it is performed to request to print through the dialog with the software robot.

Figure 6B:
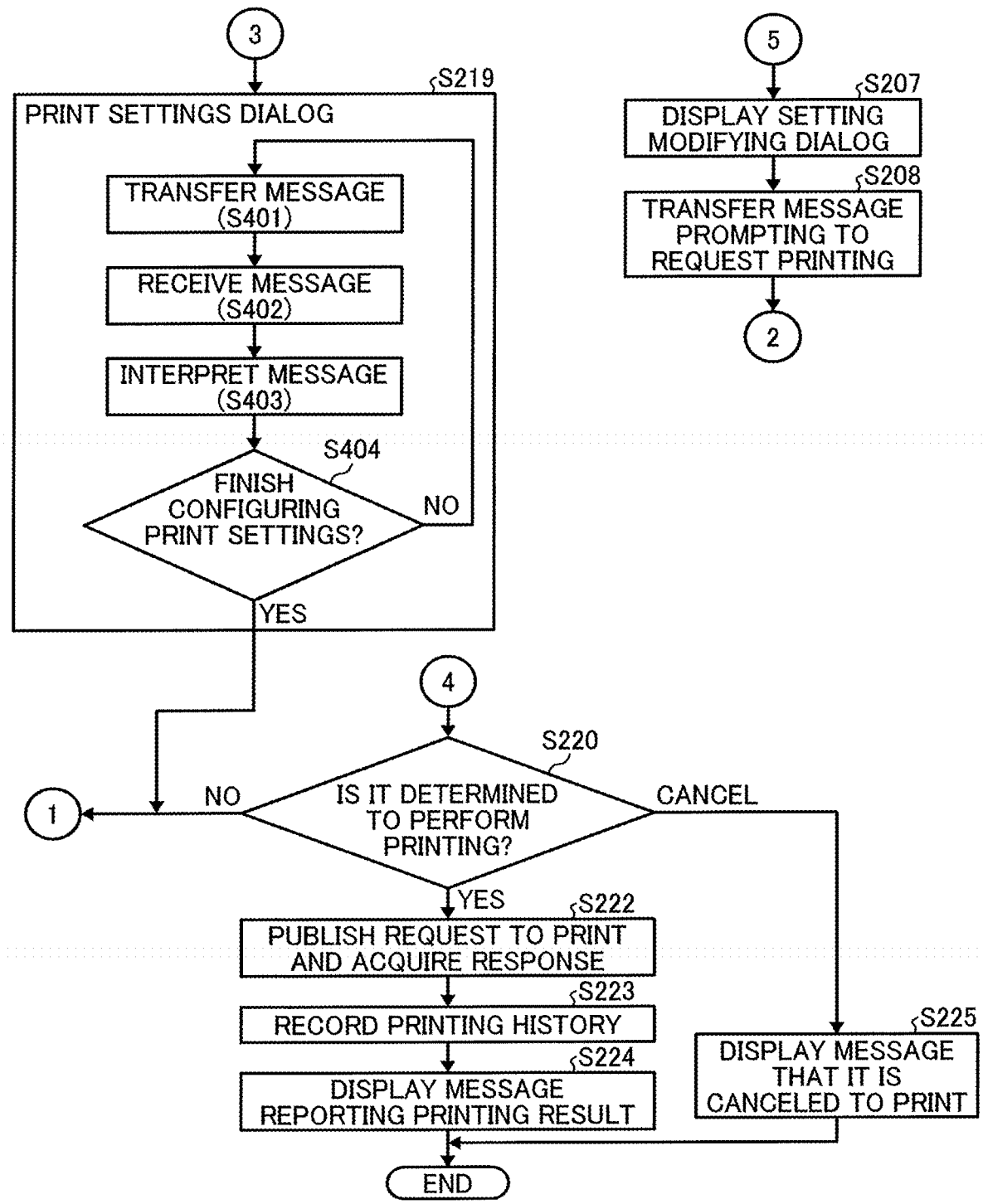

FIGS. 6A and 6B are flowcharts illustrating an operation of calling service performed by the dialog output processing server 120 in the information processing system in this embodiment. The operation illustrated in FIG. 6 starts in response to a message for starting a session transferred by the client application 250. Here, the session indicates a group of messages exchanged between the client application 250 and the bot application in order to perform a predetermined output operation.

In S201, the dialog output processing server 120 receives the message transferred by the client application 250 using the message receiver 222. In S202, the dialog output processing server 120 interprets the message using the dialog generator 230, extracts the purpose of the conversation, information for specifying the target to be printed included in the message, and print settings etc., and stores them as an internal status. In S203, first, the dialog output processing server 120 determines whether or not the initialization has been performed for the user. If it is determined that the initialization has not been performed yet (NO in S203), the operation proceeds to step S204, and an initialization dialog is performed.

In the initialization dialog performed in S204, operations of transferring a message in S301, receiving a message in S302, and analyzing the message in S303 are repeated for one or more times, and initialization can be performed by user operation by performing the dialog. In S304, the operation branches depending on whether or not the initialization has been finished. If it is determined that the initialization has not been finished yet (NO in S304), the operation goes back to S301, and the dialog continues. By contrast, if it is determined that the initialization has already been finished (YES in S304), the operation proceeds to S205.

For example, in the initialization dialog, the authentication information for the information storing service described above is stored by the dialog. In addition to the dialog by natural language, GUI components such as a button for displaying a dialog box can be displayed on the client application 250. In FIG. 8B, the initialization performed by the dialog is illustrated, and a button 1002 for calling an access authentication screen with a predetermined cloud service is located on the screen.

In S205, the dialog output processing server 120 transfers a message for prompting a request for printing. Subsequently, the operation goes back to step S201, and a subsequent message is waited for. The message transferred in S205 may include a content that explains an action requested to the user for performing printing such as "If you want to print, you can talk to me, or please tap "print" on the menu below" etc. In FIG. 8B, the message 1004 that prompts the user to request to print is transferred. Here, just after performing the initialization, even if the application in use (in this case, print) and target specifying information etc. are extracted from the first message, the internal status is reset once, and the operation is started from the beginning.

By contrast if it is determined that the initialization has already been performed (YES in S203), the operation proceeds to step S206. In S206, after analyzing the message, the dialog output processing server 120 extracts the purpose of the dialog by the user, and the operation branches depending on the specified purpose. In S206, if the message looks like a simple greeting and the purpose cannot be specified by the message analysis and it is determined that the purpose is uncertain (UNCERTAIN in S206), the operation branches to step S205, and a message that prompts to request to print is transferred.

By contrast, if it is determined that the purpose is specified as printing (including printing using the user's own default settings) (PRINT/MY PRINT in S206), the operation branches to step S209. In this case, during the corresponding session, subsequently, the application in use (in this case, print) is stored as the internal status. Here, as illustrated in FIG. 9A, the message may be a message 1102 transferred by user input in some cases. In addition, in order to make it easy to extract the user's purpose of the conversation, a menu button 1104 can be prepared as illustrated in FIG. 8B, and a fixed phrase can be transferred in response to pressing the button.

In S209, after analyzing the message, the dialog output processing server 120 determines whether or not information for specifying the target to be printed is acquired. In case of a message such as "Please print" that the application in use (in this case, print) may be extracted but the information for specifying the target may not be extracted, it is determined that the information for specifying the target is not acquired. In S209, if it is determined that the target specifying information is not acquired by analyzing the message (NO in S209), the operation branches to step S210. In S210, a message such as "Which document do you want to print?" for prompting the user to transfer information for specifying the target document. Subsequently, the operation goes back to S201 and a subsequent message is waited. Here, in this case, since the application in use (in this case, print) is stored as the internal status, it is not required to include the application in use (in this case, print) in the subsequent message.

In S209, if it is determined that the target specifying information has already been acquired (YES in S209), the operation branches to step S211. For example, if sentences such as "material for the conference tomorrow" or "document that I created yesterday" are included as illustrated in the message 1102 in FIG. 9A, by performing natural language processing, at least one item in the search condition is extracted. Therefore, it is determined that the target specifying information has been acquired.

In S211, the dialog output processing server 120 determines whether or not it is required to perform searching. Here, for the first time, it is determined that it is required to perform searching. If it is determined that it is required to perform searching (YES in S211), the operation branches to step S212. In S212, the dialog output processing server 120 performs traversal search through the documents, acquires the search result, and the operation proceeds to step S213. As described above, if the phrase such as "the material for the conference tomorrow" is included, it is possible to acquire the schedule information illustrated in FIG. 7B and acquire an electronic document from the destination link where the material is stored. In this embodiment, it is assumed that the electronic document is searched using the search condition specified from the message. However, a route for specifying an intended electronic document using a standard user interface such as a directory tree etc. can be set up.

By contrast, if the search was performed when the previous message was received, the valid search result already exists, and it is determined that it is unnecessary to perform searching (NO in S211), the operation proceeds to step S213 directly.

In S213, after performing search, the dialog output processing server 120 determines whether or not at least one candidate exists. In S213, if it is determined that no candidate is found (NO in S213), the operation proceeds to step S210. In S210, a message, in another expression for example, for prompting the user to transfer information for specifying the target document. Subsequently, the operation goes back to S201 and a subsequent message is waited. Here, in this case, since the application in use (in this case, print) is stored internally, it is unnecessary that the application in use (in this case, print) is included in the subsequent message. However, the search result is discarded. Therefore, in S211, it is determined that it is required to perform searching again.

In S213, if it is determined that at least one candidate is found (YES in S213), the operation proceeds to step S214. In S214, furthermore, after performing searching, the dialog output processing server 120 determines whether or not one candidate is specified. In S214, if multiple candidates are included in the search result and it is determined that one candidate is not specified (NO in S214), the operation branches to S215.

In S215, for example, the dialog output processing server 120 presents candidates for the target document in order of matching the condition as indicated in the message 1106 in FIG. 9A or in order of priorities based on the user's print execution history as illustrated in FIG. 7C and transfers a message prompting the user to select. Subsequently, the operation goes back to step S201, and the subsequent message is waited. Here, in this case, the selection is accepted on the message 1108 in FIG. 9A. After specifying one candidate, affirmative determination is performed in step S214. Here, in this embodiment, the candidates for the target document are presented in order of the priorities simply. In this case, in addition to the configuration illustrated in FIG. 9A, along with file names of each candidate, it is also possible to display the first page for each candidate or a thumbnail of a page updated lastly.

By contrast, if it is determined that one candidate is specified (YES in S214), the operation proceeds to step S216. In S216, after analyzing the message, the dialog output processing server 120 determines whether or not print settings are fixed. For example, if "my settings" indicating that the document is printed using the default settings is designated, it is determined that the print settings are fixed. For example, if normal "print" is designated or only a part of print settings is specified in the message, it is determined that the print settings are not fixed. If it is determined that the print settings are not fixed (NO in S216), the operation branches to step S217.

In S217, depending on information in the message, user information, and information on the target information etc., print settings to be proposed is determined. In this case, as illustrated in FIG. 7D, if the default print settings are configured as user information regardless of type, the default print settings can be determined for the proposal. In addition, print settings frequently used can be found in the user's print execution history and determine the frequent print settings for the proposal. In addition, it is possible to find an output destination from the default output destination or frequently used in the user's print execution history illustrated in FIG. 7C and determine the output destination for the proposal. Furthermore, the number of attendees can be counted from the corresponding conference information in the schedule information illustrated in FIG. 7B and propose the number of sheets to be printed.

Furthermore, if default print settings are configured for each file extension, the default print settings in accordance with the extension of the target document for the proposal can be determined. For example, if it is determined in the office policy that presentation materials are duplex printed in color and word processor documents are printed in monochrome since necessity of printing in color is low in that case, print settings suitable to the office policy can be proposed. Furthermore, if default print settings are configured associated with attributions such as file name and file title etc., the default print setting for proposal associated with the attributions can be determined. For example, if a keyword such as "company data" is included in the file name or file title, "printing in toner save mode" may be proposed, or if a keyword such as "material for customers" is included, print settings releasing the toner save mode can be proposed.

In S218, as illustrated in FIG. 9B, the dialog output processing server 120 transfers the proposed message 1202 including the determined print settings. Subsequently, the operation goes back to step S201, and the subsequent message is waited. Here in this case, as illustrated in FIG. 9B, if the button 1204a displayed along with the proposed message 1202 is pressed or a command is accepted using the affirmative message 1206 by user operation and the proposal is accepted, the affirmative determination is performed in S216.

Here, in this embodiment, for the sake of convenience, all print settings are proposed in one message. However, the proposal can be divided into multiple messages. Furthermore, if only a part of print settings is extracted from the message and all print settings are not acquired, it is possible to propose a part that can be proposed only, transfer a message to prompt the user to input deficient information, and continue the dialog.

By contrast, if it is determined that the proposed print settings are rejected by pressing the cancel button 1204b displayed along with the proposal message (REJECT PROPOSAL in S216), the operation branches to step S219.

In S219, the dialog output processing server 120 executes the print settings dialog. In the print settings dialog performed in S219, operations of transferring a message in S401, receiving a message in S402, and analyzing the message in S403 are repeated for one or more times, and print settings for the printing this time can be configured by user operation by performing the dialog. In S404, the operation branches depending on whether or not the configuration of print settings has been finished. If it is determined that the configuration of print settings has not been finished yet (NO in S404), the operation goes back to S401, and the dialog continues. By contrast, if it is determined that the configuration of print settings has already been finished (YES in S404), the operation proceeds to S221.

In addition, if it is determined that the print settings are fixed (YES in S216), the operation branches to step S220. If the proposed print settings are accepted or it is specified that the printing is performed using the default settings such as "my settings" etc., it is determined that the print settings are fixed. In S220, the dialog output processing server 120 determines whether or not print execution is confirmed. Here, for the first time, it is determined that the print execution is not confirmed. If it is determined that the print execution is not confirmed (NO in S220), the operation branches to step S221.

Figures 10A, 10B:
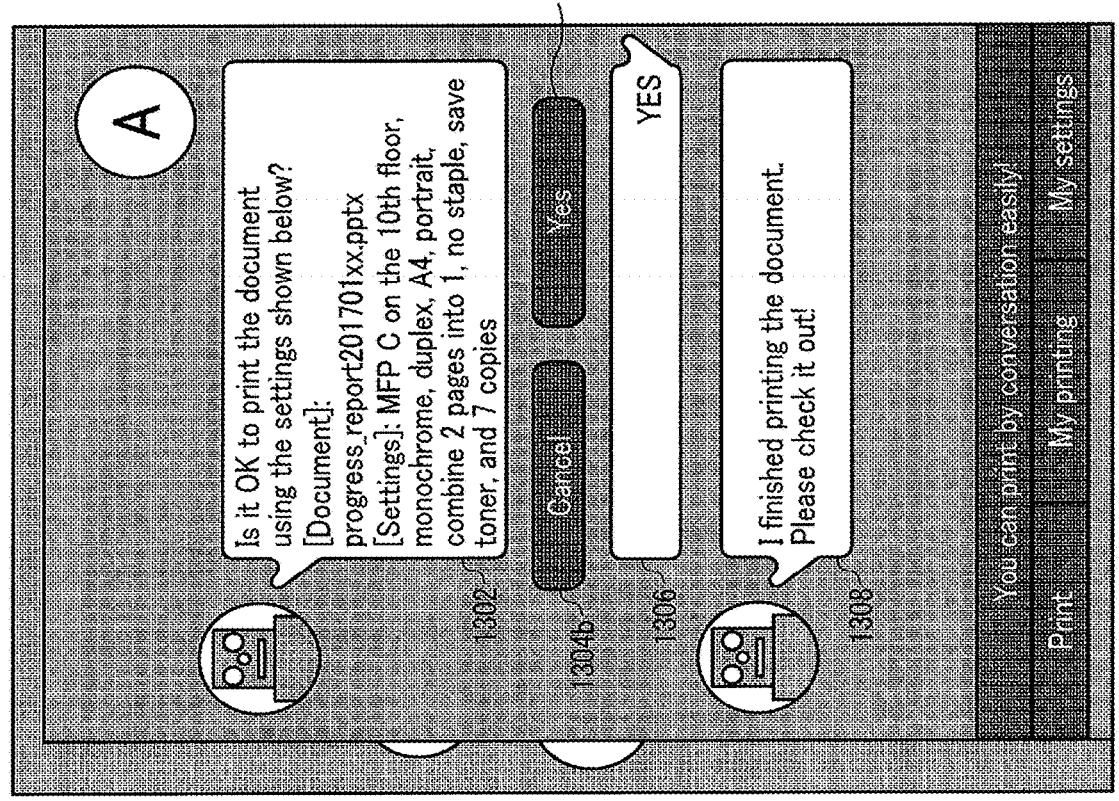
FIGS. 10A and 10B are diagrams illustrating a screen displayed on the terminal apparatus in the information processing system as an embodiment of the present invention.

In S221, as illustrated in FIG. 10A, the dialog output processing server 120 transfers the final message for confirming printing 1302. Subsequently, the operation goes back to step S201, and the subsequent message is waited. Here in this case, as illustrated in FIG. 10A, if the button 1304a displayed along with the final message for confirming printing 1302 is pressed or the execution of printing is accepted using the message 1306 by user operation, the affirmative determination is performed in S220. By contrast, it is commanded to cancel printing by pressing the cancel button 1304b displayed along with the final message for confirming printing 1302 illustrated in FIG. 10A, it is determined to cancel printing (CANCEL in S220).

If it is confirmed to perform printing (YES in S220), the operation proceeds to step S222. In S222, the dialog output processing server 120 issues the request for printing using the fixed print settings via the print processing system 204 and acquires the execution result. In S223, in response to receiving the execution result, the dialog output processing server 120 stores the result of executing printing. In S224, the dialog output processing server 120 transfers a message reporting the result of printing, and the session ends. In some cases, the message reporting the result of printing may be a message indicating that the printing is finished successfully 1308 as illustrated in FIG. 10A. In other cases, the message reporting the result of printing may be a message indicating that the printing failed.

By contrast, if it is commanded to cancel printing (CANCEL in S220), the operation proceeds to step S225. In S225, the dialog output processing server 120 transfers a message reporting that the printing is canceled, and the session ends.

With reference to step S206 again, by interpreting the message, if it is determined that the purpose of configuring the user's own default settings (MY SETTINGS in S206), the operation branches to step S207. In S207, after displaying a dialog for modifying the default settings, the modification is accepted. In S208, a message of prompting to request to print is transferred.

In the settings modification dialog, just like the initialization dialog, operations of transferring a message, receiving a message, and analyzing the message are repeated for one or more times, and initialization can be performed by user operation by performing the dialog.

Figure 11A:
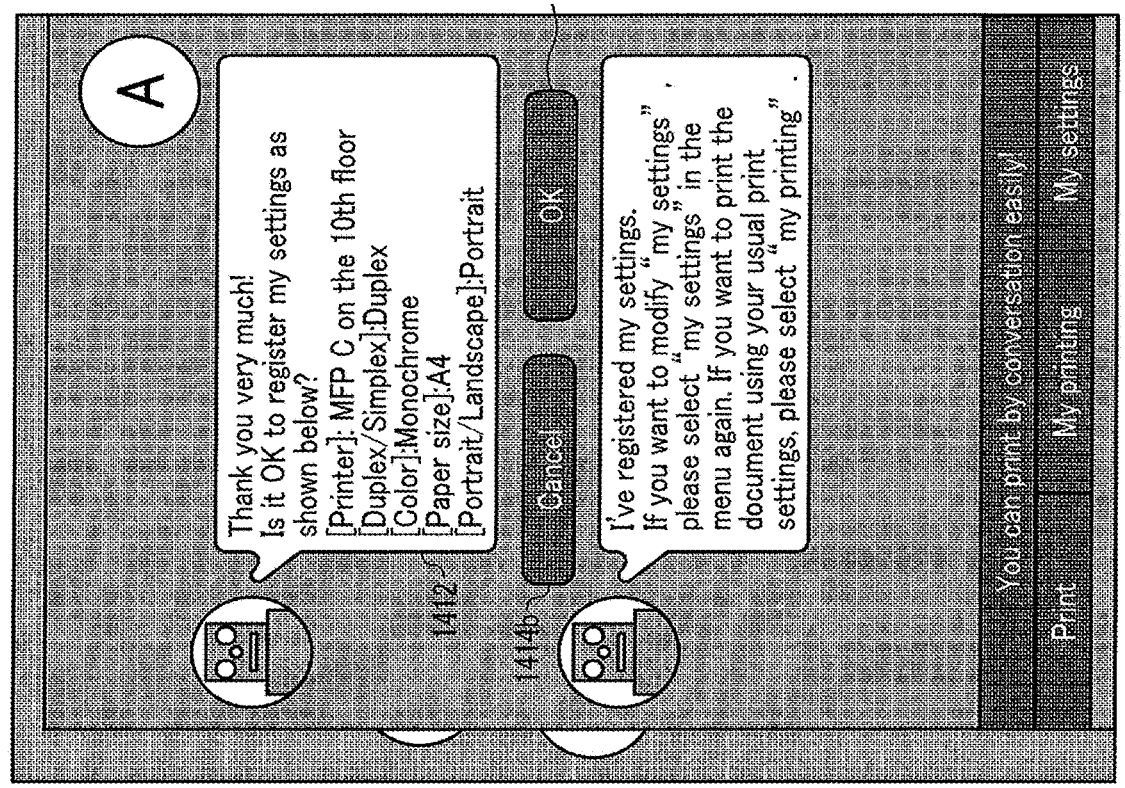
FIGS. 11A and 11B are diagrams illustrating a screen displayed on the terminal apparatus in the information processing system as an embodiment of the present invention.
Figure 11B:
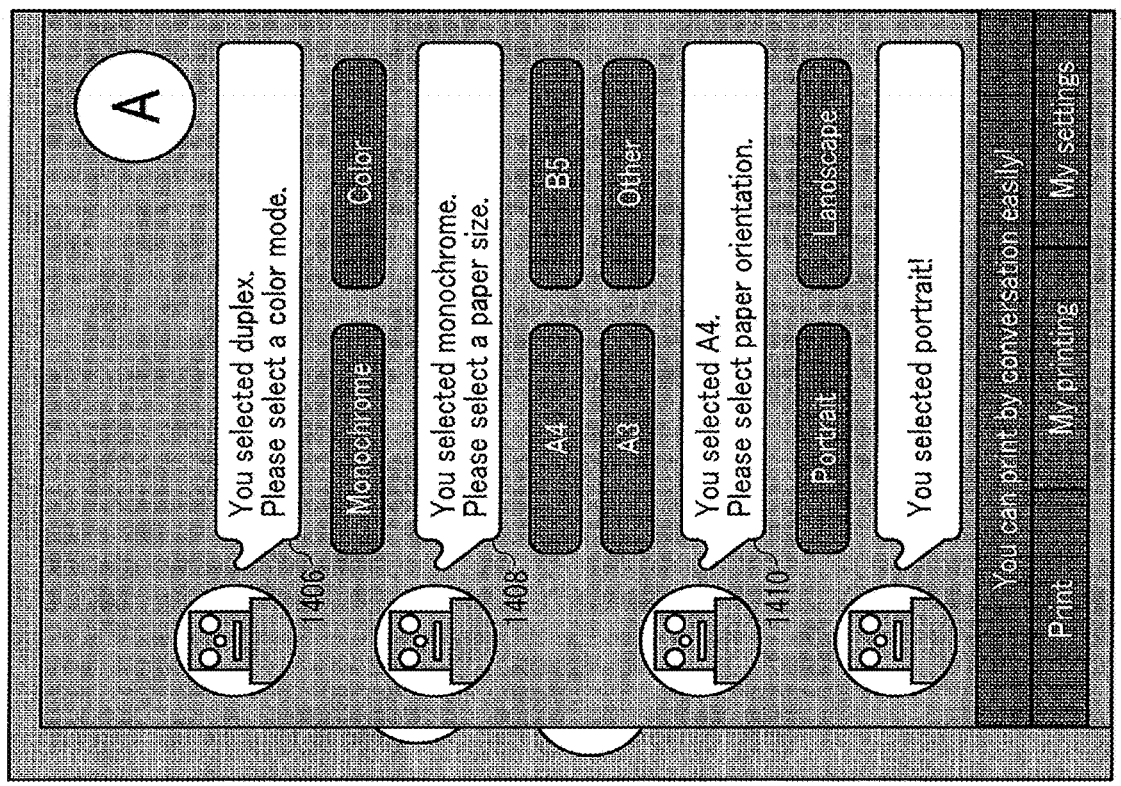

FIGS. 10B, 11A, and 11B illustrate dialogs in the settings modification dialog. In FIGS. 10B, 11A, and 11B, the dialog output processing server 120 transfers a message for requesting to select a printer to be configured 1402, a message for requesting to select print format 1404, a message for requesting to select color mode 1406, a message for requesting to select paper size 1408, and a message for requesting to select printing orientation 1410 in order and accepts selection for each setting item. Subsequently, the dialog output processing server 120 transfers a message for confirming contents of print settings to be registered as default print settings (confirmation message) 1412. In this case, as illustrated in FIG. 11B, if a button 1414a displayed along with the confirmation message 1412 is pressed or user's intention confirming that settings are fixed is accepted by a message input by user operation, the default print settings are configured using the contents. By contrast, if it is commanded to cancel configuration by pressing a cancel button 1414b displayed along with the confirmation message 1412 illustrated in FIG. 11B, the configured contents are discarded, and the operation starts from the beginning.

Figure 12:
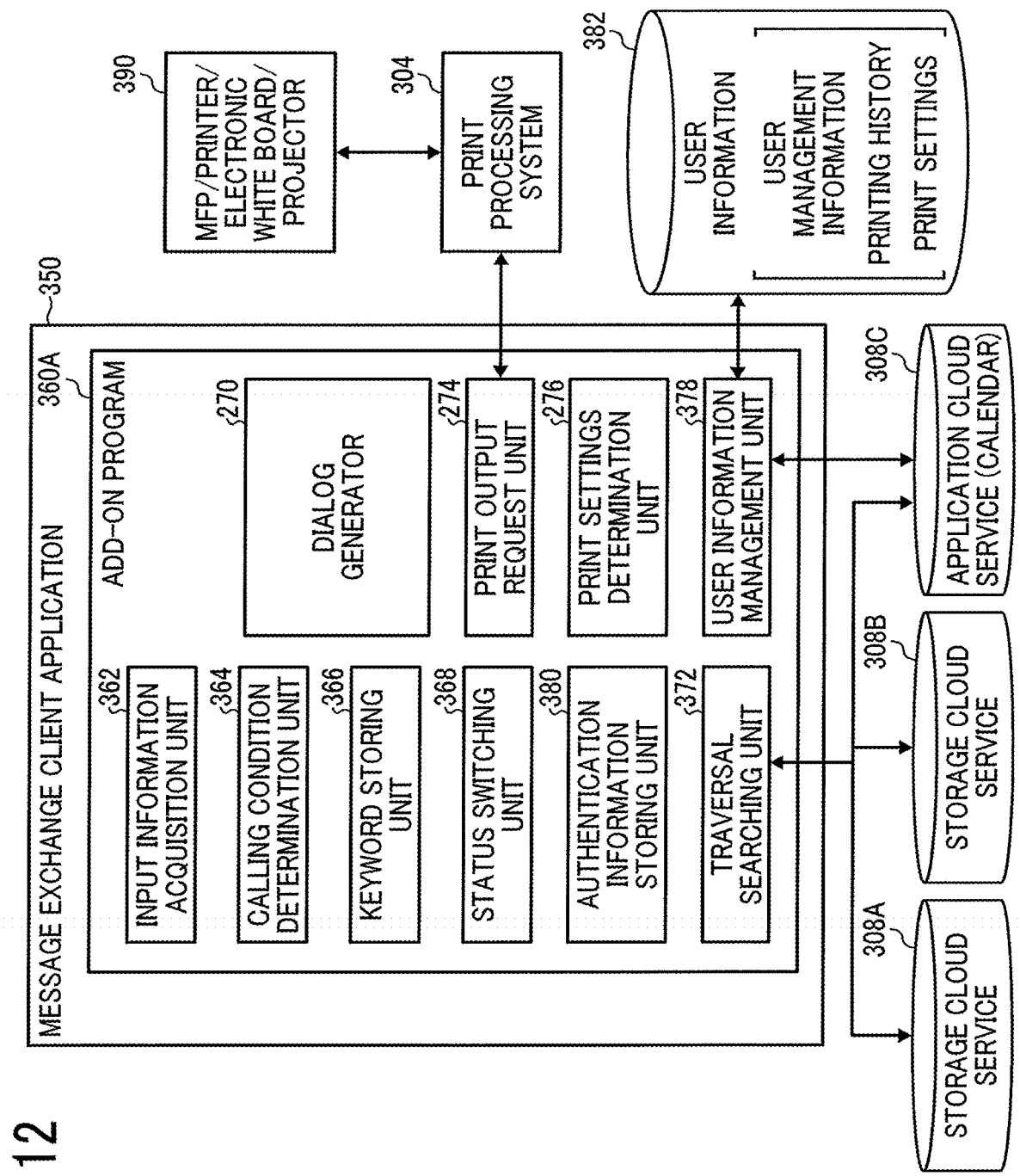
FIG. 12 is a diagram illustrating functional blocks implemented in the information processing system as an embodiment of the present invention.

In the embodiment described above with reference to FIGS. 1 to 11B, as illustrated in FIG. 4, functional blocks are divided into functional blocks in the client application 250 side and functional block in the software robot application 220 side. With reference to FIG. 12, another embodiment that implements functions described above by using functional blocks in the client application 250 side only is described below.

FIG. 12 is a diagram illustrating functional blocks implemented in the information processing system in this embodiment. As illustrated in FIG. 12, in the information processing system in this embodiment, in the message exchange client application 350, in addition to the input information acquisition unit 362, the calling condition determination unit 364, the keyword storing unit 366, and the status switching unit 368 just like the functional blocks described above, an add-on program 360A includes the functional blocks described above as functional blocks in the application for printing 220A in the server side with reference to FIG. 4.

More specifically, the add-on program 360A further includes the dialog generator 330, the traversal searching unit 332, the print output requesting unit 334, the print settings determination unit 336, the user information management unit 338, and the authentication information storing unit 340. In the embodiment illustrated in FIG. 12, the software robot described above resides in the message exchange client application 350.

Other than exchanging messages described above internally, the input information acquisition unit 362, the calling condition determination unit 364, the keyword storing unit 366, the status switching unit 368, the dialog generator 330, the traversal searching unit 332, the print output requesting unit 334, the print settings determination unit 336, the user information management unit 338, and the authentication information storing unit 340 operate in the similar manner as illustrated in FIG. 4.

The separation of functional blocks illustrated in FIG. 4 is just an example, and as illustrated in FIG. 12, both the service switching function and the dialog output processing function on the terminal apparatus 150 can be implemented. Furthermore, in another embodiment, the functional blocks may be implemented in various ways different from the embodiments illustrated in FIGS. 4 and 12.

In the embodiments described above, the information processing system that saves the effort of complicated operations for using the software robot service on the message exchange client application 250 and enables to request the information apparatuses 192 to 196 to perform intended information processing is provided.

In the information processing system in the embodiments described above, it is determined whether or not the condition as the trigger of performing the predetermined output operation is satisfied. If the condition is satisfied, the service provided by the corresponding software robot is launched, and the corresponding document is searched and outputting the corresponding document is proposed. As a result, instead of performing operation of registering additional software robot and switching software robot required in the existing technologies, is possible to request information apparatuses to perform information processing.

In addition, since the software robot is configured to be able to process natural language, just by talking to the software robot in colloquial language, the user may search for the appropriate electronic document through the multiple information storing services in a traversal manner and output the electronic document using the settings most suitable to the searched electronic document. In these days, many users utilize multiple information storing services, and labor of searching for an intended document is increasing. Therefore, the function that may search for the appropriate electronic document through the multiple information storing services in a traversal manner is helpful. In the embodiments described above, by performing the new operation of inputting natural language via the client application 250, the information processing system may cooperate with the information storing services and printing system in the background and request the information apparatus to perform information processing using the terminal apparatus 150.

In the embodiments described above, the information processing system that saves the effort of complicated operations for using the information processing service on the message exchange program and enables to request the information apparatus to perform intended information processing is provided.

Note that the above-described embodiments are examples of embodiments of the claimed invention, and the embodiments of the claimed invention are not limited to the above-described embodiments. The above-described embodiments can be variously modified within the scope of the claimed invention.

For example, elements and/or features of different illustrative embodiments may be combined with each other and/or substituted for each other within the scope of this disclosure and appended claims.

The present invention also encompasses a non-transitory recording medium storing a program that executes an information processing method performed by an information processing system. The information processing method, performed by the information processing system, includes the steps of.

It should be noted that the case that the computer apparatus reads and executes the program code is just one example to implement the functional units in the embodiments described above. In addition, in accordance with instructions by the program code, an operating system (OS) running on the computer apparatus may perform a part of the operations or all operations. Furthermore, the functional units described in the above embodiments may obviously be implemented by performing those operations.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing system, comprising:
  circuitry configured to
    acquire first input information input to a first terminal apparatus, the first terminal apparatus executing an information exchange program, and the first input information being sent to a second terminal apparatus that exchanges information with the first terminal apparatus via the information exchange program;

determine, based on the first input information input to the first terminal apparatus, whether or not a condition corresponding to an image processing service is satisfied;

change, based on the determination that the condition is satisfied, a first status of the information exchange program into a second status in which the first input information input to the first terminal apparatus is sent to the image processing service corresponding to the condition, the image processing service being different than the second terminal apparatus to which the first input information input to the first terminal apparatus is sent when the information exchange program is in the first status; and request a particular image processing apparatus to execute image processing corresponding to the image processing service, the particular image processing apparatus being determined from among a plurality of image processing apparatuses based on second input information sent to the image processing service when the information exchange program is in the second status, the second input information being different than the first input information.

2. The information processing system of claim 1, wherein the circuitry is further configured to acquire, based on the second input information sent to the image processing service in the second status, electronic information used for the image processing; and request the particular image processing apparatus to execute the image processing using the electronic information.

3. The information processing system of claim 2, wherein the circuitry is further configured to acquire the electronic information after the first status of the information exchanging program has been changed into the second status.

4. The information processing system of claim 2, Wherein the image processing indicates any one of printing the electronic information using an image forming apparatus as the particular image processing apparatus, projecting the electronic information using a projector as the particular image processing apparatus, transferring the electronic information using an image communication apparatus as the particular image processing apparatus, and storing an image in a storage location indicated by the electronic information received from an image input apparatus.

5. The information processing system of claim 1, wherein the circuitry is further configured to determine, based on the first input information input to the first terminal apparatus, whether or not any of a plurality of conditions corresponding to a plurality of image processing services, respectively, is satisfied; and change the first status of the information exchange program into the second status in which the first input information input to the first terminal apparatus is sent to the image processing service corresponding to the condition that is determined to be satisfied among the plurality of the conditions corresponding to the plurality of image processing services.

6. The information processing system of claim 1, wherein the processing circuitry is further configured to determine whether or not the first input information input to the first terminal apparatus includes a keyword; and change, when the first input information input to the first terminal apparatus includes the keyword, the first status of the information exchange program into the second status in which the first input information input to the first terminal apparatus is sent to the image processing service corresponding to the keyword.

7. The information processing system of claim 1, wherein the information exchange program operated by the first terminal apparatus is an instant messaging client application;

the image processing service is a software robot that accepts the request to execute image processing and requests the particular image processing apparatus to execute the image processing; and the first status of the information exchange program includes one of a status in which a chat room for exchanging the input information with the software robot is displayed and a status in which a notification reporting that the chat room is available is displayed.

8. The information processing system of claim 1, wherein the second input information indicates the particular image processing apparatus among the plurality of image processing apparatuses, and the circuitry is configured to request the particular image process in apparatus indicated by the second input information to execute the image processing corresponding to the image processing service.

9. An information processing method, comprising:

acquiring first input information input to a first terminal apparatus, the first terminal apparatus executing an information exchange program, and the first input information being sent to a second terminal apparatus that exchanges information with the first terminal apparatus via the information exchange program;

determining, based on the first input information input to the first terminal apparatus, whether or not a condition corresponding to an image processing service is satisfied;

changing, based on the determination that the condition is satisfied, a first status of the information exchange program into a second status in which the first input information input to the first terminal apparatus is sent to the image processing service corresponding to the condition, the image processing service being different than the second terminal apparatus to which the first input information input to the first terminal apparatus is sent when the information exchange program is in the first status; and requesting a particular image processing apparatus to execute image processing corresponding to the image processing service, the particular image processing apparatus being determined from among a plurality of image processing apparatuses based on second input information sent to the image processing service when the information exchange program is in the second status, the second input information being different than the first input information.

10. The information processing method of claim 9, further comprising:

acquiring, based on the second input information sent to the image processing service in the second status, electronic information used for the image processing; and requesting the particular image processing apparatus to execute the image processing using the electronic information.

11. The information processing method of claim 10, wherein the acquiring step comprises acquiring the electronic information after the first status of the information exchanging program has been changed into the second status.

12. The information processing method of claim 10, wherein the image processing indicates any one of printing the electronic information using an image forming apparatus as the particular image processing apparatus, projecting the electronic information using a projector as the particular image processing apparatus, transferring the electronic information using an image communication apparatus as the particular image processing apparatus, and storing an image in a storage location indicated by the electronic information received from an image input apparatus.

13. The information processing method of claim 9, further comprising:
  determining, based on the first input information input to the first terminal apparatus, whether or not any of a plurality of conditions corresponding to a plurality of image processing services, respectively, is satisfied; and
  changing the first status of the information exchange program into the second status in which the first input information input to the first terminal apparatus is sent to the image processing service corresponding to the condition that is determined to be satisfied among the plurality of the conditions corresponding to the plurality of image processing services.

14. The information processing method of claim 9, further comprising:
  determining whether or not the first input information input to the first terminal apparatus includes a keyword; and
  changing, when the first input information input to the first terminal apparatus includes the keyword, the first status of the information exchange program into the second status in which the first input information input to the first terminal apparatus is sent to the image processing service corresponding to the keyword.

15. The information processing method of claim 9, wherein
  the information exchange program operated by the first terminal apparatus is an instant messaging client application;
  the image processing service is a software robot that accepts the request to execute image processing and requests the particular image processing apparatus to execute the image processing; and
  the first status of the information exchange program includes one of a status in which a chat room for exchanging the input information with the software robot is displayed and a status in Which a notification reporting that the chat room is available is displayed.

16. The information processing apparatus of claim 9, wherein the second input information indicates the particular image processing apparatus among the plurality of image processing apparatuses, and the requesting step comprises requesting the particular image processing apparatus indicated by the second input information to execute the image processing corresponding to the image processing service.

17. A terminal apparatus, comprising:
  circuitry configured to
    acquire first input information input to the terminal apparatus, the terminal apparatus executing an information exchange program, and the first input information being sent to another terminal apparatus that exchanges information with the terminal apparatus via the information exchange program;
    determine, based on the first input information input to the terminal apparatus, whether or not a condition corresponding to an image processing service is satisfied,
    change, based on the determination that the condition is satisfied, a first status of the information exchange program into a second status in which the first input information input to the terminal apparatus is sent to the image processing service corresponding to the condition, the image processing service being different than the another terminal apparatus to which the first input information input to the terminal apparatus is sent when the information exchange program is in the first status; and
    request a particular image processing apparatus to execute image processing corresponding to the mince processing service, the particular image processing apparatus being determined from among a plurality of image processing apparatuses based on second input information sent to the image processing service when the information exchange program is in the second status, the second input information being different than the first input information.

18. The terminal apparatus of claim 17, wherein the circuitry that is configured to acquire the first input information, determine whether or not the condition is satisfied, and change the first status of the information exchange program is implemented by using either (1) a program as a part of the information exchange program in the terminal apparatus or (2) a program different from the information exchange program in the terminal apparatus, and the circuitry is further configured to acquire the first input information input into the information exchange program based on an acquired screenshot or an acquired keystroke, and request the information exchange program to change the status.

19. The terminal apparatus according to claim 17, wherein the terminal apparatus is any one of a mobile information device, an image processing apparatus, a communication robot, and a hologram projector.

20. The information processing apparatus of claim 17, wherein the second input indicates the particular image processing apparatus among the plurality of image processing apparatuses, and the circuitry is configured to request the particular image processing apparatus indicated by the second input information to execute the image processing corresponding to the image processing service.

* * * * *